United States Patent [19]

Lehmann

[11] Patent Number: 4,960,870
[45] Date of Patent: Oct. 2, 1990

[54] HEAVY METAL COMPLEX AZO DYES CONTAINING A BENZOTHIOPHENE-1,1-DIOXIDE, 2,1-BENZOTHIAZINE-2,2-DIOXIDE, 1,4-BENZOTHIAZINE-1,1-DIOXIDE OR THIENOPYRIDINE-1,1-DIOXIDE COUPLING COMPONENT

[75] Inventor: Urs Lehmann, Basle, Switzerland

[73] Assignee: Ciba-Geigy Corporation, Ardsley, N.Y.

[21] Appl. No.: 150,597

[22] Filed: Feb. 1, 1988

[30] Foreign Application Priority Data

Feb. 11, 1987 [CH] Switzerland .................... 496/87

[51] Int. Cl.$^5$ .................... C09B 45/06; C09B 45/16; D06P 1/10; D06P 3/32
[52] U.S. Cl. .................... 534/619; 534/622; 534/627; 534/628; 534/629; 534/696; 534/697; 534/698; 534/703; 534/602
[58] Field of Search ............ 534/703, 696, 697, 629, 534/619, 622, 627, 628

[56] References Cited

U.S. PATENT DOCUMENTS

| | | | |
|---|---|---|---|
| 2,186,629 | 1/1940 | Dickey | 8/50 |
| 2,338,728 | 1/1944 | McNally et al. | 260/152 |
| 2,560,502 | 7/1951 | Bastehorn et al. | 534/703 |
| 3,234,208 | 2/1966 | Liechti et al. | 260/193 |
| 4,497,734 | 2/1985 | Mennicke | 534/703 X |

FOREIGN PATENT DOCUMENTS

| | | | |
|---|---|---|---|
| 255078 | 12/1912 | Fed. Rep. of Germany | 534/703 |
| 269747 | 1/1914 | Fed. Rep. of Germany | 534/703 |
| 480904 | 8/1929 | Fed. Rep. of Germany | 534/703 |
| 273342 | 4/1914 | Fed. Rep. of Germany | 534/703 |
| 0018203 | 10/1956 | Fed. Rep. of Germany | 534/703 |
| 1011100 | 6/1957 | Fed. Rep. of Germany | 534/703 |
| 1129702 | 9/1956 | France | 534/703 |
| 1160503 | 3/1958 | France | 534/703 |
| 1161923 | 3/1958 | France | 534/703 |
| 1174032 | 11/1958 | France | 534/703 |
| 069946 | 1/1959 | France | 534/703 |

OTHER PUBLICATIONS

Calsoulacos et al., Journal of Heterocyclic Chemistry, vol. 16, No. 5, pp. 1503–1524(1979).
Loev et al., Journal of Heterocyclic Chemistry, vol. 4, pp. 403–406 (1967).
Martoni, Annali di Chimica (1956), pp. 773–780.
Tolstikov et al., Journal of Organic Chemistry of the USSR, 20 pp. 2032–2036 (1984).
Prasad et al., Canadian Journal of Chemistry, vol. 44, pp. 1247–1258 (1966).
Claasz II, Chem. Berichte, vol. 45, pp. 747–756 (1912).
Claasz IV, Chem. Berichte, vol. 49, pp. 350–363 (1916).
Regitz, Chem. Berichte, vol. 98, pp. 36–45 (1965).

Primary Examiner—Floyd D. Higel
Attorney, Agent, or Firm—Wenderoth, Lind & Ponack

[57] ABSTRACT

The heavy metal complex dyes of azo or azomethine dyes of the formula

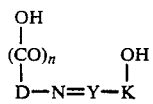

(1)

in which D is the radical of a dizao component of the benzene, naphthalene or heterocyclic series, K—OH is the radical of the formula

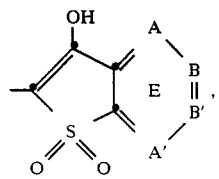

(2)

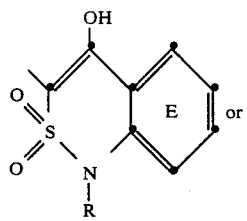

(3)

or

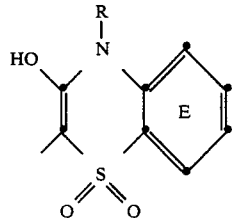

(4)

in which the symbols A, A', B and B' each represent a carbon atom or in which one of the symbols A, A', B or B' represents a nitrogen atom while the others represent a carbon atom, R is hydrogen, substituted or unsubstituted $C_1$–$C_4$alkyl or substituted or unsubstituted phenyl, and the ring E can be further substituted, Y is a nitrogen atom or a CH group, and n is 0 or 1, and in which —(CO)$_n$—OH is bonded to D in a position adjacent to —N=Y—, produce dyeings having good fastnesses particular very good crock, wet, wet crock and light fastness on nitrogen-containing or hydroxyl-containing fibre materials.

17 Claims, No Drawings

HEAVY METAL COMPLEX AZO DYES CONTAINING A BENZOTHIOPHENE-1,1-DIOXIDE, 2,1-BENZOTHIAZINE-2,2-DIOXIDE, 1,4-BENZOTHIAZINE-1,1-DIOXIDE OR THIENOPYRIDINE-1,1-DIOXIDE COUPLING COMPONENT

The present invention relates to novel heavy metal complex dyes, to processes for preparing the same and to the use of these dyes for dyeing and printing materials of fibrous structures, in particular textile materials, and also leather.

The present invention has for its object to find new heavy metal complex dyes which are suitable for dyeing and printing in particular natural and synthetic polyamide fibre materials and also hydroxyl-containing fibre materials from an aqueous bath.

This object is achieved with the heavy metal complex dyes according to the invention of azo or azomethine dyes of the formula (1).

The present invention accordingly provides heavy metal complexes of azo or azomethine dyes of the formula

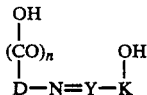  (1)

in which D is the radical of a diazo component of the benzene, naphthalene or heterocyclic series, K—OH is the radical of the formula

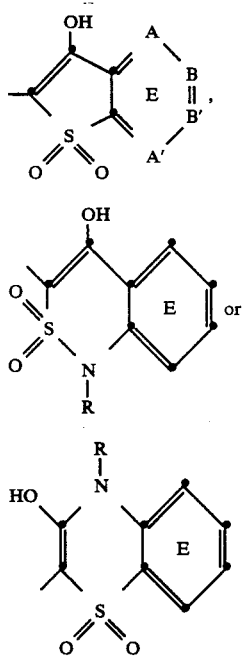

in which the symbols A, A', B and B' each represent a carbon atom or in which one of the symbols A, A', B or B' represents a nitrogen atom while the others represent a carbon atom, R is hydrogen, substituted or unsubstituted $C_1$–$C_4$alkyl or substituted or unsubstituted phenyl, and the ring E can be further substituted, Y is a nitrogen atom or a CH group, and n is 0 or 1, and in which —(CO)$_n$—OH is bonded to D in a position adjacent to —N=Y—.

The radical D—(CO)$_n$—OH can be any desired metallizable diazo component of the benzene, naphthalene or heterocyclic series, but in particular comprises an aminophenol, an aminonaphthol or aminobenzoic acid, each of which, in addition to the metallizable group, can also contain the substituents customary in azo dyes. Examples of such substituents are: alkyl groups having 1 to 8, preferably 1 to 4, carbon atoms, e.g. methyl, ethyl, propyl, isopropyl, butyl, isobutyl, sec-butyl, tert-butyl, hexyl, octyl, alkoxy groups having 1 to 8 carbon atoms, in particular 1 to 4 carbon atoms, e.g. methoxy, ethoxy, propoxy, isopropoxy, butoxy, acylamino groups such as alkanoylamino groups having 2 to 8 carbon atoms and alkoxycarbonylamino groups having 2 to 8 carbon atoms, e.g. acetylamino, propionylamino, methoxycarbonylamino, ethoxycarbonylamino, benzoylamino, amino, mono- or dialkylamino having 1 to 8 carbon atoms in the alkyl radical, phenylamino, alkoxycarbonyl having 1 to 8 carbon atoms in the alkoxy radical, nitro, cyano, trifluoromethyl, halogen, such as fluorine, bromine or in particular chlorine, sulfamoyl, sulfamoyl which is monosubstituted or disubstituted on the nitrogen atom by $C_1$–$C_4$alkyl, $C_1$–$C_4$alkoxy-$C_1$–$C_4$alkyl, hydroxy-$C_1$–$C_4$alkyl, $C_5$–$C_7$cycloalkyl or phenyl, carbamoyl, ureido, hydroxyl, $C_1$–$C_8$alkylsulfonyl, phenylsulfonyl, carboxyl, sulfomethyl, sulfo, fibre-reactive radicals and arylazo groups, for example a phenylazo or naphthylazo group.

An alkyl radical R in the formulae (3) and (4) can be: methyl, ethyl, propyl, isopropyl, butyl, isobutyl, sec-butyl, tert-butyl and the corresponding radicals which are substituted for example by hydroxyl, alkoxy having 1 to 4 carbon atoms, phenyl, sulfo, sulfato or halogen or a fibre-reactive radical, e.g. β-hydroxyethyl, β-methoxyethyl, β-chloroethyl, benzyl.

A substituted phenyl radical R in the formulae (3) and (4) is for example a phenyl radical substituted by $C_1$–$C_4$alkyl, $C_1$–$C_4$alkoxy, $C_2$–$C_6$alkanoylamino, sulfo or halogen. R is in particular hydrogen.

Examples of substituents on the ring E in the formulae (2), (3) and (4) are the same substituents as indicated above for D—(CO)$_n$—OH. Furthermore, the benzene ring E in the formula (2), when A, A', B and B' in the formula (2) are each a carbon atom, can contain a fused-on benzene ring in position B or B' (naphththiophene radical).

In the radical of the formula (2), A, A', B and B' are each preferably a carbon atom; if one of the radicals is a nitrogen atom, A, A' and B are each preferably a carbon atom and B' is a nitrogen atom.

Preference is given to heavy metal complexes which contain as the heavy metal a copper, nickel, iron, chromium or cobalt atom.

Particular preference is given to heavy metal complexes of azo or azomethine dyes of the formula (1) in which a molecule of the azo or azomethine dye of the formula (1) is bonded to one atom of copper or nickel;

two molecules of the azo or azomethine dye of the formula (1) are bonded to one atom of nickel or cobalt;

one or two molecules of the azo or azomethine dye of the formula (1) is or are bonded to one atom of chromium;

one molecule of the azo or azomethine dye of the formula (1) and one molecule of another metallizable azo or azomethine compound are bonded to one atom of chromium.

Preference is further given to heavy metal complexes of azo dyes of the formula (1) where Y is a nitrogen atom; in particular, Y is a nitrogen atom for the abovementioned particularly preferred heavy metal complexes.

The heavy metal complexes of the azo or azomethine dyes of the formula (1) in which K—OH is the radical of the formula (2) are particularly preferred when A, A', B and B' are each a carbon atom, in particular the heavy metal complexes specified above as particularly preferred, and very particularly the heavy metal complexes in which Y is a nitrogen atom.

Particular reference is further given to the heavy metal complexes as stated above in which the azo or azomethine dye of the formula (1) contains no, one or two sulfo groups.

Very particular preference is given to the heavy metal complexes, in particular the copper, nickel, chromium and cobalt complexes, of azo dyes of the formula

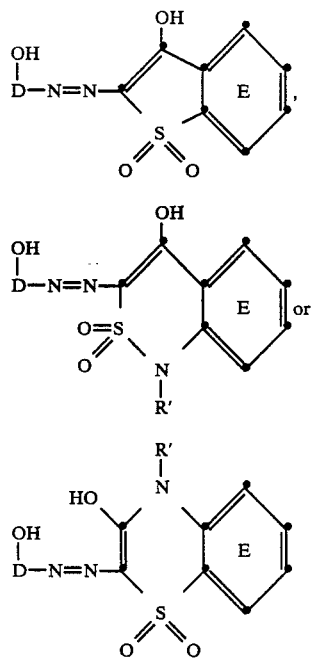

in which D is a phenyl or naphthyl radical which can be substituted by $C_1$–$C_4$alkyl, $C_1$–$C_4$alkoxy, $C_2$–$C_6$alkanoylamino, $C_1$–$C_6$alkoxycarbonylamino, benzoylamino, amino, mono- or dialkylamino having in each case 1 to 4 carbon atoms in the alkyl radical, phenylamino, $C_1$–$C_4$alkoxycarbonyl, nitro, cyano, trifluoromethyl, halogen, sulfamoyl, $C_1$–$C_4$-alkyl-or $C_1$–$C_4$alkoxy-$C_1$–$C_4$alkyl-substituted sulfamoyl, carbamoyl, ureido, hydroxyl $C_1$–$C_4$alkylsulfonyl, carboxyl, sulfomethyl, sulfo, fibre-reactive radicals and phenylazo groups, or D—OH is a carboxyphenyl radical which can be substituted by the abovementioned substituents, R' is hydrogen or $C_1$–$C_4$alkyl, and the benzo ring E can be substituted by $C_1$–$C_4$alkyl, $C_1$–$C_4$alkoxy, $C_2$–$C_6$alkanoylamino, $C_1$–$C_6$alkoxycarbonylamino, benzoylamino, amino, mono- or dialkylamino having in each case 1 to 4 carbon atoms in the alkyl radical, phenylamino, $C_1$–$C_4$alkoxycarbonyl, nitro, cyano, trifluoromethyl, halogen, sulfamoyl, carbamoyl, ureido, hydroxyl, $C_1$–$C_4$alkylsulfonyl, carboxyl, sulfomethyl, sulfo, fibre-reactive radicals and phenylazo groups, and in which the hydroxyl group in D is in the o-position relative to the azo group.

The heavy metal complexes of azo dyes of the formula (5), (6) or (7) which contain as heavy metal a cobalt or chromium atom are particularly interesting, in particular those which contain two molecules of the azo dye of the formula (5), (6) or (7) bonded to one atom of cobalt.

Importance further attaches to the chromium complexes which contain, bonded to one atom of chromium, a molecule of the azo dye of the formula (5), (6) or (7) and a molecule of the dye of formula

in which $D_1$ is the radical of a diazo component of the benzene or naphthalene series or of the heterocyclic series, $K_1$ is the radical of a coupling component of the benzene, naphthalene or heterocyclic series or of a ketomethylene compound, Y' is a nitrogen atom or a CH group, $Z_1$ is an —OH or —COOH or $NH_2$ group in the o-position relative to —N=Y'— and $Z_2$ is a —OH or —NH(R) group, R being hydrogen, substituted or unsubstituted $C_1$–$C_4$alkyl or substituted or unsubstituted phenyl, and $Z_2$ is bonded to $K_1$ in a position adjacent to —N=Y'—. Preferably, Y' is a nitrogen atom.

Particular importance attaches to the abovementioned chromium complexes in which in the formula (8) $D_1$ is a phenyl or naphthyl radical which can be substituted by $C_1$–$C_4$alkyl, $C_1$–$C_4$alkoxy, $C_2$–$C_6$alkanoylamino, $C_1$–$C_6$alkoxycarbonylamino, benzoylamino, amino, mono- or dialkylamino having in each case 1 to 4 carbon atoms in the alkyl radical, phenylamino, $C_1$–$C_4$alkoxycarbonyl, nitro, cyano, trifluoromethyl, halogen, sulfamoyl, carbamoyl, ureido, hydroxyl, $C_1$–$C_4$alkylsulfonyl, carboxyl, sulfomethyl, sulfo, fibre-reactive radicals and phenylazo groups, $K_1$ is a radical of a coupling component of the benzene or naphthalene series or of the 5-pyrazolone, 5-aminopyrazole, quinoline, acetoacetarylide or benzoylacetarylide series which can be substituted by $C_1$–$C_4$alkyl, $C_1$–$C_4$alkoxy, $C_2$–$C_6$alkanoylamino, $C_1$–$C_6$alkoxycarbonylamino, benzoylamino, amino, mono- or dialkylamino having in each case 1 to 4 carbon atoms in the alkyl radical, phenylamino, $C_1$–$C_4$alkoxycarbonyl, nitro, cyano, trifluoromethyl, halogen, sulfamoyl, carbamoyl, ureido, hydroxyl, $C_1$–$C_4$alkylsulfonyl, carboxyl, sulfomethyl, sulfo, fibre-reactive radicals and phenylazo groups, and Y' is a nitrogen atom.

Very particular importance attaches to heavy metal complexes which contain, bonded to one atom of chromium, an azo dye of the formula (5) in which D—OH is a 2-hydroxy-4-sulfonaphth-1-yl, 2-hydroxy-4-sulfo-6-nitronaphth-1-yl or 2-hydroxy-4-nitrophen-1-yl radical and the benzene ring E is unsubstituted, and a molecule of the azo dye of the formula (8) in which $D_1$–$Z_1$ is a 2-hydroxy-5-nitrophen-1-yl, 2-hydroxy-4-sulfonaphth-1-yl or 2-hydroxy-4-nitrophen-1-yl radical, $K_1$–$Z_2$ is a 1-hydroxy-5,8-dichloronaphth-2-yl, 2-hydroxynaphth-1-yl, 2-hydroxy-6-sulfonaphth-1-yl or 1-phenyl-3-methyl-5-pyrazolone radical, and Y' is a nitrogen atom.

Particular importance further attaches to heavy metal complexes which contain, bonded to one atom of cobalt or chromium, two molecules of the azo dye of the formula (5), (6) or (7) in which D—OH is a 2-hydroxy-4-nitrophen-1-yl, 2-hydroxy-5-nitrophen-1-yl, 2-hydroxy-4-nitro-5-sulfophen-1-yl, 2-hydroxy-3-sulfo-5-nitrophen-1-yl, 2-hydroxy-3-nitro-5-sulfophen-1-yl, 2-hydroxy-3-sulfo-5-chlorophen-1-yl, 2-hydroxy-4-sulfonaphth-1-yl, 2-hydroxy-4-sulfo-6-nitronaphth-1-yl, 2-hydroxy-4-sulfo-6-aminonaphth-1-yl, 2-hydroxy-4-sulfo-6-($\alpha,\beta$-dibromopropionylamino)-naphth-1-yl, 2-hydroxy-5-($\beta$-methoxyethylaminosulfonyl)phen-1-yl, 2-hydroxy-4-aminophen-1-yl, 2-hydroxy-4-($\alpha,\beta$-dibromopropionylamino)-phen-1-yl or 2-carboxy-4-sulfophen-1-yl radical, the benzene ring E in the formulae (5) and (6) is unsubstituted and in the formula (7) can be substituted by nitro, amino or $\alpha,\beta$-dibromopropionylamino, and R' is hydrogen.

Particular importance also attaches to the 1:1 chromium complexes of the azo dyes of the formulae (5) and (7) in which D—OH is a 2-hydroxy-4-nitrophen-1-yl, 2-hydroxy-4-nitro-5-sulfophen-1-yl, 2-hydroxy-4-sulfonaphth-1-yl, 2-hydroxy-4-sulfo-6-nitronaphth-1-yl, 2-hydroxy-4-sulfo-6-aminonaphth-1-yl, 2-hydroxy-4-sulfo-6-($\alpha,\beta$-dibromopropionylamino)-naphth-1-yl or 2-carboxy-4-sulfophen-1-yl radical, the benzene ring E in the formula (5) is unsubstituted and in the formula (7) can be substituted by nitro, amino or $\alpha,\beta$-dibromopropionylamino, and R' is hydrogen.

The heavy metal complexes according to the invention can contain a fibre-reactive radical in the ligand of the formula (1) and, in the case of 1:2 chromium complex dyes which contain a ligand of the formula (1) and a further metallizable azo dye as a further ligand, not only in the ligand of the formula (1) but also in the other ligand.

A fibre-reactive radical is understood as meaning acyl radicals which have one or more reactive groups or detachable substituents in the molecule and which are capable of reaction for example with cellulose materials in the presence of acid-binding agents with or without heating by reacting with the hydroxyl groups of the cellulose, or with synthetic or natural polyamide fibres, for example wool, by reacting with the NH$_2$ groups of these fibres, to form covalent bonds. Fibrereactive groupings of this type are described in large numbers in the literature, for example in EP-A-No. 0,142,104.

Preferably, the fibre-reactive radical is of the aliphatic or heterocyclic series and bonded to the heavy metal complex either directly or via a bridge member.

Preferably, the fibre-reactive radical is bonded to the heavy metal complex via an unsubstituted or monoalkylated amino group such as —NH—, —N(CH$_3$)—, —N(C$_2$H$_5$)— or —N(C$_3$H$_7$)—, or via a bridge member containing an amino group, or via the radical —NR— in the formulae (3) and (4).

The fibre-reactive radical is particularly preferably an acryloyl, mono-, di- or trihaloacryloyl or -methacryloyl, mono- or dihalopropionyl, phenylsulfonylpropionyl, vinylsulfonylpropionyl, $\beta$-chloroethylsulfonylpropionyl, methylsulfonylpropionyl or $\beta$-sulfatoethylsulfonyl radical or a radical of the mono-, di- or trihalopyrimidyl or mono- or dihalotriazinyl series.

Very particularly preferred fibre-reactive radicals are the 2,4-difluoro-5-chloropyrimidin-6-yl, the $\alpha,\beta$-dibrompropionyl and the $\alpha$-bromoacryloyl radical.

The preferred fibre-reactive radicals are bonded to the heavy metal complex in particular via a bridge member of the formula

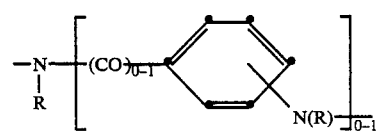

or —CH$_2$—N(R)—, where R is as defined under the formula (3). The heavy metal complexes can contain up to four fibre-reactive radicals. Preference is given to one or two fibre-reactive radicals.

The present invention also provides a process for preparing the heavy metal complexes according to the invention of azo or azomethine dyes of the formula (1), which comprises reacting an azo or azomethine dye of the formula (1) with a heavy metal atom donor compound or with a heavy metal compound capable of addition reaction with the azo or azomethine dye of the formula (1).

Suitable heavy metals are in particular copper, nickel, iron, cobalt or chromium. These metals are used in the form of the customary salts or complex compounds, for example copper sulfate, copper acetate, copper complexes of aliphatic aminocarboxylic acids, hydroxycarboxylic acids, di- or tricarboxylic acids or of aromatic hydroxycarboxylic acids such as of glycocol, of lactic acid, oxalic acid, citric acid, salicylic acid and in particular of tartaric acid; nickel sulfate, cobalt(II) sulfate, cobalt(II) acetate, freshly precipitated cobalt(II) hydroxide; chromium(III) chloride, chromium(III) fluoride, chromium(III) formate, chromium(III) acetate, Cr(OH)SO$_4$, iron(III) chloride and also complex iron and chromium compounds of aliphatic dicarboxylic acids, hydroxycarboxylic acids or aromatic hydroxycarboxylic acids, for example sodium chromium salicylate.

It is also possible to use chromium(VI) compounds such as alkali metal chromates if the reaction mixture contains a reducing agent (for example butanol or glucose).

The reaction with the heavy metal donor is effected in accordance with the customary processes, depending on the solubility of the components in various solvents, for example water, ethanol, formamide, glycol ether, pyridine and the like, if desired at elevated temperatures, in a weakly acid to alkaline medium and in such a way as to produce metal complexes which contain, per molecule of azo compound, one or half an atom of metal in a complex bond. In this way 1:1 copper, 1:1 nickel, 1:2 nickel, 1:1 chromium, 1:2 chromium, 1:2 iron and 1:2 cobalt complexes are obtained.

The reaction is carried out at room temperature or advantageously at elevated temperatures under atmospheric pressure or under superatmospheric pressure in the presence or absence of suitable additives, for example salts of organic acids, bases or other agents which promote complexing. The pH conditions are determined by the nature of the metallization process; for instance, the coppering with copper sulfate is carried out under weakly acid conditions but that with tetramine copper sulfate under alkaline conditions.

In the case of 1:2 complexes, both the azo dyes which are bonded to the same metal atom can conform to the formula (1). Preferably they are then identical compounds. Symmetrical complexes of this type have nickel or in particular cobalt as the metal atom. However, one of the azo or azomethine dyes present in 1:2 complexes can also be another metallizable azo or azomethine dye.

Preferred procedures comprise reacting one molecule of the azo or azomethine dye of the formula (1) with a compound donating one atom of copper or nickel;

reacting two molecules of the azo or azomethine dye of the formula (1) with a compound donating one atom of nickel or cobalt;

reacting one or two molecules of the azo or azomethine dye of the formula (1) with a compound donating one atom of chromium;

reacting one molecule of the azo or azomethine dye of the formula (1) and one molecule of another metallizable azo or azomethine dye with a compound donating one atom of chromium, or reacting one molecule of the azo or azomethine dye of the formula (1) with a 1:1 chromium complex azo or azomethine dye.

A further preferred procedure of the process according to the invention comprises using azo dyes of the formula (1), i.e. dyes where in the formula (1) Y is a nitrogen atom. In particular, Y is a nitrogen atom in the process according to the invention for preparing the abovementioned preferred 1:1 copper or 1:1 nickel, 1:2 nickel or 1:2 cobalt, 1:1 chromium or 1:2 chromium complexes and also asymmetrical 1:2 chromium complexes which contain one molecule of the azo dye of the formula (1) and one molecule of another metallizable azo or azomethine compound.

A particularly preferred procedure comprises using as the azo or azomethine dye of the formula (1) such a dye in which K—OH is a radical of the formula (2) and A, A', B and B' are each a carbon atom, and then reacting with a heavy metal donor compound, in particular with a copper, nickel, cobalt or chromium atom donor compound A further particularly preferred procedure comprises reacting azo or azomethine dyes of the formula (1) with a heavy metal atom donor compound, the heavy metal complex formed containing no, one or two sulfo groups.

A very particularly preferred procedure comprises reacting a copper, nickel, cobalt or chromium atom donor compound with an azo dye of the formula

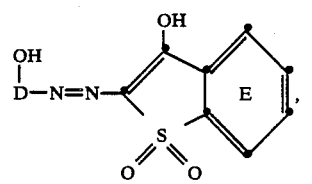 (5)

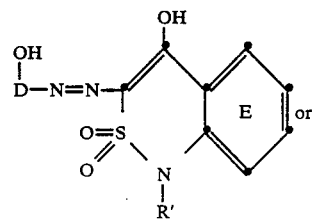 (6) or

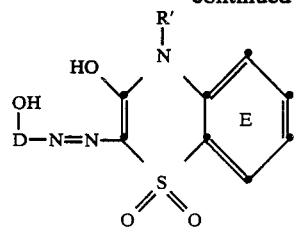 (7)

in which D, R' and E are as defined for the formulae (5), (6) and (7). Particular preference is given to the use of chromium donor and in particular cobalt donor compounds, in the case of cobalt complex two azo dyes of the formula (5), (6) or (7) being reacted with one atom of the cobalt.

Important asymmetrical chromium complexes are prepared in accordance with the process according to the invention by reacting a molecule of the azo dye of the formula (5), (6) or (7) and a molecule of the azo or azomethine dye of the formula (8) with a compound which donates one atom of chromium.

A variant of this procedure comprises first preparing the 1:1 chromium complex of the azo dye of the formula (5), (6) or (7) or of the azo or azomethine dye of the formula (8) and then reacting this 1:1 complex with the azo or azomethine dye of the formula (8) or with a dye of the formula (5), (6) or (7).

A very particularly important procedure comprises reacting a chromium atom donor compound with an azo dye of the formula (5), (6) or (7) and an azo dye of the formula (8) in which $D_1$ is a phenyl or naphthyl radical which can be substituted by $C_1$-$C_4$alkyl, $C_1$-$C_4$alkoxy, $C_2$-$C_6$alkanoylamino, $C_1$-$C_6$alkoxycarbonylamino, benzoylamino, amino, mono and dialkylamino having in each case 1 to 4 carbon atoms in the alkyl radical, phenylamino, $C_1$-$C_4$alkoxycarbonyl, nitro, cyano, trifluoromethyl, halogen, sulfamoyl, carbamoyl, ureido, hydroxyl, $C_1$-$C_4$alkylsulfonyl, carboxyl, sulfomethyl, sulfo, fibre-reactive radicals and phenylazo groups, and $K_1$ is such a radical of a coupling component of the benzene or naphthalene series or of the 5-pyrazolone, 5-aminopyrazole, quinoline, acetoacetarylide or benzoylacetarylide series as can be substituted by $C_1$-$C_4$alkyl, $C_1$-$C_4$alkoxy, $C_2$-$C_6$alkanoylamino, $C_1$-$C_6$-alkoxycarbonylamino, benzoylamino, amino, mono- or dialkylamino having in each case 1 to 4 carbon atoms in the alkyl radical, phenylamino, $C_1$-$C_4$alkoxycarbonyl, nitro, cyano, trifluoromethyl, halogen, sulfamoyl, carbamoyl, ureido, hydroxyl, $C_1$-$C_4$alkylsulfonyl, carboxyl, sulfomethyl, sulfo, fibre-reactive radicals and phenylazo groups.

It is preferred to use an azo dye of the formula (8), i.e. a dye where Y' is a nitrogen atom.

Very particularly interesting heavy metal complexes are obtained by reacting a chromium atom donor compound with an azo dye of the formula (5) in which D—OH is a 2-hydroxy-4-sulfonaphth-1-yl, 2-hydroxy-4-sulfo-6-nitronaphth-1-yl or 2-hydroxy-4-nitrophen-1-yl radical and the benzene ring E is unsubstituted, and with a molecule of the azo dye of the formula (8) in which $D_1$-$Z_1$ is a 2-hydroxy-5-nitrophen-1-yl, 2-hydroxy-4-sulfonaphth-1-yl or 2-hydroxy-4-nitrophen-1-yl radical, $K_1$-$Z_2$ is a 1-hydroxy-5,8-dichloronaphth-2-yl, 2-hydroxynaphth-1-yl, 2-hydroxy-6-sulfonaphth-1-yl or 1-phenyl-3-methyl-5-pyrazolone radical, and Y' is a nitrogen atom.

Further particularly important heavy metal complexes are obtained by reacting a compound which donates a chromium or cobalt atom with two molecules of the azo compound of the formula (5), (6) or (7) in which the benzene ring is unsubstituted in the formulae (5) and (6) and can be substituted in the formula (7) by nitro, amino or α,β-dibromopropionylamino and R' is hydrogen, and in which D—OH is a 2-hydroxy-4-nitrophen-1-yl, 2-hydroxy-5-nitrophen-1-yl, 2-hydroxy-4-nitro-5-sulfophen-1-yl, 2-hydroxy-3-sulfo-5-nitrophen-1-yl, 2-hydroxy-3-nitro-5-sulfophen-1-yl 2-hydroxy-3-sulfo-5-chlorophen-1-yl, 2-hydroxy-4-sulfonaphth-1-yl, 2-hydroxy-4-sulfo-6-nitronaphth-1-yl, 2-hydroxy-4-sulfo-6-aminonaphth-1-yl, 2-hydroxy-4-sulfo-6-(α,β-dibromopropionylamino)naphth-1-yl, 2-hydroxy-5-(β-methoxyethylaminosulfonyl)phen-1-yl, 2-hydroxy-4-aminophen1-yl, 2-hydroxy-4-(α,β-dibromopropionylamino)phen-1-yl or 2-carboxy-4-sulfophen-1-yl radical.

Further particularly important 1:1 chromium complexes are obtained by reacting a chromium atom donor compound with azo dyes of the formulae (5) or (7) in which the benzene ring E is unsubstituted in the formula (5) and can be substituted in the formula (7) by nitro, amino or α,β-dibromopropionylamino, and R' is hydrogen, and in which D—OH is a 2-hydroxy-4-nitrophen-1-yl, 2-hydroxy-4-nitro-5-sulfophen-1-yl, 2-hydroxy 4-sulfonaphth-1-yl, 2-hydroxy-4-sulfo-6-nitronaphth-1-yl, 2-hydroxy-4-sulfo-6-aminonaphth-1-yl, 2-hydroxy-4-sulfo-6-(α,β-dibromopropionylamino)naphth-1-yl or 2-carboxy-4-sulfophen-1-yl radical.

The azo dyes of the formula (1) are prepared in a manner known per se by diazotizing an amine of the formula

         (9)

and coupling onto a coupling component of the formula

         (10)

where D, K and n are as defined under the formula (1).

The diazotization of the diazo component of the formula (9) is in general effected through the action of nitrous acid in aqueous mineral acid solution at low temperatures and the coupling onto the coupling component of the formula (10) at acid, neutral or alkaline pH.

The azo dyes of the formula (8) are known and are prepared in a manner known per se by diazotizing an amine of the formula

         (11)

and coupling onto a coupling component of the formula

         (12)

where $D_1$, $K_1$, $Z_1$ and $Z_2$ are as defined under the formula (8).

The diazotization of the diazo component of the formula (11) is in general effected through the action of nitrous acid in aqueous mineral solution at low temperatures and the coupling onto the coupling component of the formula (12) at acid, neutral or alkaline pH.

Suitable amines of the formula (9) and of the formula (11) are for example:
2-amino-1-hydroxybenzene, 2-amino-1-methoxybenzene, anthranilic acid, 4- or 5-sulfonamidoanthranilic acid, 5-sulfoanthranilic acid, 3- or 5-chloroanthranilic acid, 4-chloro- and 4,6-dichloro-2-amino-1-hydroxybenzene, 4- or 5- or 6-nitro-2-amino-1-hydroxybenzene, 4-chloro- or 4-methyl- or 4-acetylamino-6-nitro-2-amino-1-hydroxybenzene, 6-acetyl-amino- or 6-chloro-4-nitro-2-amino-1-hydroxybenzene, 4-cyano-2-amino-1-hydroxybenzene, 4-methoxy-2-amino-1-hydroxybenzene, 2-amino-1-hydroxyphen-5-yl methyl or benzyl sulfone, 2-amino-1-hydroxyphen-4-yl methyl, ethyl, chloromethyl or butyl sulfone, 6-chloro-, 5-nitro- or 6-nitro-2-amino-1-hydroxyphen-4-yl methyl sulfone, 2-amino-1-hydroxybenzene-4-or -5-sulfamide, sulf-N-methylamide or -sulf-N-β-hydroxyethylamide, 2-amino-1-methoxybenzene-4-sulfanilide, 2-amino-1-hydroxybenzene-4-(β-methoxyethylsulfamide), 4-methoxy-5-chloro-2-amino-1-hydroxybenzene, 4-methyl-2-amino-1-hydroxybenzene, 4-chloro-5-nitro-2-amino-1-hydroxybenzene, 5-nitro-4-methyl-2-amino-1-hydroxybenzene, 5-nitro-4-methoxy-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5-or -6-sulfonamide, 4- or 5-chloroanisidine, 4- or 5-nitroanisidine, 2-methoxy-5-methylaniline, 2,5-dimethoxyaniline, 2-anisidin-4-or -5-yl β-hydroxyethyl sulfone, 4-methyl-6-sulfo-2-amino-1-hydroxybenzene, 2-amino-4-sulfo-1-hydroxybenzene, 4-chloro-6-sulfo-2-amino-1-hydroxybenzene, 6-chloro-4-sulfo-2-amino-1-hydroxybenzene, 5-nitro-4-sulfo-2-amino-1-hydroxybenzene, 4-nitro-6-sulfo-2-amino-1-hydroxybenzene, 6-nitro-4-sulfo-2-amino-1-hydroxybenzene, 4-nitro-6-acetylamino-2-amino-1-hydroxybenzene, 4-acetylamino-2-amino-1-hydroxybenzene, 4-nitro-6-sulfo-2-amino-1-hydroxybenzene, 4-acetylamino-6-sulfo-2-amino-1-hydroxybenzene, 5-acetylamino-2-amino-1-hydroxybenzene, 6-acetylamino-4-sulfo-2-amino-hydroxybenzene, 4-chloro-2-amino-1-hydroxybenzene-5-sulfamide, 2-amino-1-hydroxybenzene-4-(N-2'-carboxyphenyl)sulfamide, 2-amino-1-hydroxyphen-5-yl methyl sulfone, 1-amino-2-hydroxy-4-sulfonaphthalene, 1-amino-2-hydroxy-4-sulfo-6-nitronaphthalene, 1-amino-2-hydroxy-4-sulfo-6-acetamidonaphthalene, 1-amino-2-hydroxy-4,8-disulfonaphthalene, 1-amino-2-hydroxy-6-sulfonaphthalene, 1-amino-2-hydroxy-7-sulfonaphthalene, 1-amino-2-hydroxy-8-sulfonaphthalene, 2-amino-1-hydroxy-4-sulfonaphthalene, 2-amino-1-hydroxy-6-sulfonaphthalene, 2-amino-1-hydroxy-4,8-disulfonaphthalene.

The coupling components of the formula (12) can be derived for example from the following groups of coupling components:

naphthols which couple in the o-position relative to the OH group and which can be substituted by halogen, in particular chlorine, amino, acylamino, in particular acetylamino, acyl, such as acetyl, $C_1-C_4$-alkyl, $C_1-C_4$alkoxy, sulfonamido, N-mono- or N,N-disubstituted sulfonamido groups, sulfo and sulfonyl groups;

naphthylamines which couple in the o-position relative to the amino group and which can be substituted by halogen, in particular bromine, $C_1-C_4$alkyl, $C_1-C_4$alkoxy, sulfonamido, sulfo or sulfonyl groups;

5-pyrazolones or 5-aminopyrazoles which have in the 1-position a phenyl or naphthyl radical which can be substituted by halogen, for example chlorine, nitro, $C_1-C_4$alkyl and $C_1-C_4$alkoxy groups, sulfonamido, N-alkylated or N-alkoxyalkylated sulfonamido groups, sulfo or sulfonyl groups and in particular amino groups;

2,6-dihydroxy-3-cyano- or -3-carboxamido-4-alkylpyridines and 6-hydroxy-2-pyridones which can be substituted in the 1-position by substituted or unsubstituted $C_1-C_4$alkyl, for example methyl, isopropyl, $\beta$-hydroxyethyl, $\beta$-aminoethyl, $\gamma$-isopropoxypropyl or by $-NH_2$ or a substituted amino group such as for example dimethylamino or diethylamino, and carrying in the 3-position a cyano or carboxamido group and in the 4-position a $C_1-C_4$alkyl group, in particular methyl;

acetoacetanilides and benzoylacetanilides which can be substituted in the anilide nucleus by $C_1-C_4$alkyl, $C_1-C_4$alkoxy or $C_1-C_4$-alkylsulfonyl groups, $C_1-C_4$hydroxyalkyl, $C_1-C_4$alkoxyalkyl or $C_1-C_4$-cyanoalkylsulfonyl groups, sulfonamido, N-alkylated or N-alkoxyalkylated sulfonamido groups, sulfo,acetylamino and halogen;

phenols which are substituted by low molecular weight acylamino groups, such as acetylamino, and/or by $C_1-C_5$alkyl groups and which couple in the o-position, and also hydroxyphenols, in particular resorcinol;

quinolones, for example quinol-2-ones, in particular 1-$C_1-C_4$alkyl 4-hydroxyquinol-2-one.

In general, the coupling components mentioned can contain the substituents customary in azo dyes.

Examples of such coupling components are:

2-naphthol, 1-naphthol, 1-hydroxynaphthalene-4- or -5- or -8-sulfonic acid or -3,6- or -4,8-disulfonic acid, 1,3- or 1,5-hydroxynaphthalene, 1-hydroxy-7-aminonaphthalene-3-sulfonic acid, 2-naphthol-6-sulfonamide, 1-hydroxy-7-amino- or -7-N-methyl- or 7-N-acetylaminonaphthalene-3-sulfonic acid, 2-naphthol-6-yl-$\beta$-hydroxyethyl sulfone, 1-hydroxy-6-amino- or -6-N-methyl- or -6-N-acetylaminonaphthalene-3-sulfonic acid, 1-hydroxy-7-aminonaphthalene-3,6-disulfonic acid, 1-hydroxy-6-aminonaphthalene-3,5-disulfonic acid, 1-acetylamino-7-naphthol, 1-hydroxy-6-N-(4'-aminophenyl)-aminonaphthalene-3-sulfonic acid, 1-hydroxy-5-aminonaphthalene-3-sulfonic acid, 1-propionylamino-7-naphthol, 2-hydroxy-6-aminonaphthalene-4-sulfonic acid, 1-carbomethoxyamino-7-naphthol, 1-hydroxy-8-aminonaphthalene-5-sulfonic acid, 1-carboethoxyamino-7-naphthol, 1-hydroxy-8-aminonaphthalene-5,7-disulfonic acid, 1-carbopropoxyamino-7-naphthol, 1-hydroxy-8-aminonaphthalene-3-sulfonic acid, 1-dimethylaminosulfonylamino-7-naphthol, 6- or 8-acetylamino-2-naphthol, 1-hydroxy-8-aminonaphthalene-3,5- or -3,6-disulfonic acid, 4-acetylamino-2-naphthol, 2-hydroxy-5-aminonaphthalene-4,7-disulfonic acid, 4-methoxy-1-naphthol, 4-acetylamino-1-naphthol, 1-naphthol-3-, -4-, -5- or -8-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1- or -5- or -6-sulfonic acid, 2-aminonaphthalene-5-, -6- or -7-sulfonamide, 2-aminonaphthalene-6(-N-methyl, -ethyl-, -isopropyl-, -$\beta$-hydroxyethyl- or -$\gamma$-methoxypropyl)sulfonamide, 2-aminonaphthalene-6-sulfanilide, 2-aminonaphthalene-6(-N-methyl)sulfanilide, 1-aminonaphthalene-3-, -4- or -5-sulfonamide, 1-aminonaphth-5-yl methyl or ethyl sulfone, 5,8-dichloro-1-aminonaphthalene, 2-phenylaminonaphthalene, 2-N-methylaminonaphthalene, 2-N-ethylaminonaphthalene, 2-phenylaminonaphthalene-5-, -6-or -7-sulfonamide, 6-methyl-2-aminonaphthalene, 6-bromo-2-aminonaphthalene, 6-methoxy-2-aminonaphthalene, 1,3-dimethylpyrazolone, 3-methyl-5-pyrazolone, 1-phenyl-3-methyl-5-pyrazolone, 1-phenyl-3-carbonamido-5-pyrazolone, 1-(2'-, 3'- or 4'-methylphenyl)-3-methyl-5-pyrazolone, 1-[3' or 4'-($\beta$-hydroxyethylsulfonyl)phenyl]-3-methyl-5-pyrazolone, 1-(2'-methoxyphenyl)-3-methyl-5pyrazolone, 1-(2'-, 3'- or 4'-chlorophenyl)-3-methyl-5-pyrazolone, 1-(2'-, 3'- or 4'-nitrophenyl)-3-methyl-5-pyrazolone, 1-(2',5'- or 3',4'-dichlorophenyl)-3-methyl-5-pyrazolone, 1-(2'-, 3'- or 4'-sulfamoylphenyl)-3-methyl-5-pyrazolone, 1-(2'-, 3'- or 4'-methylsulfonylphenyl)-3-methyl-5-pyrazolone, 2,6-dihydroxy-3-cyano-4-methylpyridine, 1-methyl-3-cyano-4-ethyl-6-hydroxypyrid-2-one, 1-amino-3-cyano-4-methyl-6-hydroxypyrid-2-one, 1-phenyl-3-carboxmido-4-methyl-6-hydroxypyrid-2-one, acetoacetanilide, acetoacet-o-, -m- or -p-sulfonanilide, acetoacet-4-($\beta$-hydroxyethylsulfonyl)-anilide, acetoacet-o-anisidide, acetoacetnaphthylamide, acetoacet-o-toluidide, acetoaceto-o-chloroanilide, acetoacet-m- or -p-chloroanilide, acetoacetanilide-3- or -4-sulfonamide, acetoacet-3- or -4-aminoanilide, acetoacet-m-xylidide, benzoylacetanilide, 4-methylphenol, 3-dialkylaminophenol, in particular 3-dimethylaminophenol and 3-diethylaminophenol, 4-t-butylphenol, 4-t-amylphenol, 2- or 3-acetylamino-4-methylphenol, 2-methoxycarbonylamino-4-methylphenol, 2-ethoxycarbonylamino-4-methylphenol, resorcinol, 3,4-dimethylphenol and 2,4-dimethylphenol, 3-amino-4-sulfophenol, 1-(4'-aminophenyl)-3-methyl-5-pyrazolone, 1-(2'-, 3'- or 4'-sulfophenyl)-3-methyl-5-pyrazolone, 1-(2'-chloro-4'- or -5'-sulfophenyl)-3-methyl-5-pyrazolone, 1-(2-methyl-6'-chlorophenyl)-3-methyl-5-pyrazolone, 1-(2'-methyl-4'-sulfophenyl)-3-methyl-5-pyrazolone, 1-(2'-, 3'- or 4'-chloro-or methyl- or sulfophenyl)-3-carboxy-5-pyrazolone, 1-[5'-sulfonaphth-2'-yl]-3-methyl-5-pyrazolone, 1-[4''amino-2',2''-disulfostilb-4'-ene]-3-methyl-5-pyrazolone, 1-ethyl-3-cyano4-methyl-6-hydroxypyrid-2-one, 1-ethyl-3-sulfomethyl-4-methyl-6-hydroxypyrid-2-one, 2,6-dihydroxy-3-cyano-4-sulfomethylpyridine, 2,4,6-trihydroxypyrimidine, 1-methyl-4-hydroxyquinol-2-one.

To prepare the azomethine dyes of the formula (1), the abovementioned aromatic amines of the formula (9)

are reacted in a known manner with the compounds of the formula

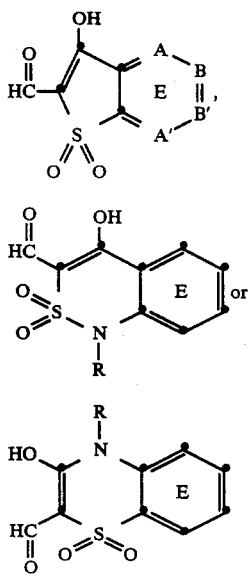

which are obtainable by formylation of the compounds of the formulae

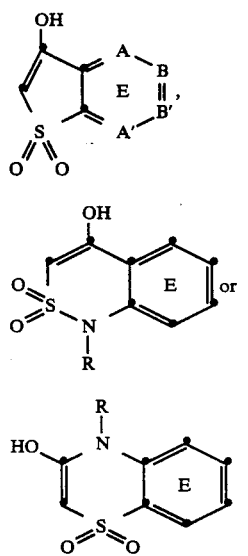

in a manner known per se, A, A', B and B', R and E being defined as indicated in the formulae (2), (3) and (4).

Suitable coupling components of the formula (10) are for example:

benzothiophen-3-one 1,1-dioxide, 5-nitrobenzothiophen-3-one 1,1-dioxide, 5-aminobenzothiophen-3-one 1,1-dioxide, 5-acetylaminobenzothiophen-3-one 1,1-dioxide, 6-chlorobenzothiophen-3-one 1,1-dioxide, naphthothiophen-3-one 1,1-dioxide and also 3-oxo-4-hydroxy-5-(ethyl, isopropyl, isobutyl or methylthioethyl)-7-methyl(or -7-butyl)-2,3-dihydrothieno[2.3]-pyridine 1,1-dioxide;

2,1-benzothiazin-4-one 2,2-dioxide, N-methyl-2,1-benzothiazin-4-one 2,2-dioxide, N-acetyl-2,1-benzothiazin-4-one 2,2-dioxide, 6-bromo-2,1-benzothiazin-4-one 2,2-dioxide, 6-bromo-N-methylbenzothiazin-4-one 2,2-dioxide;

1,4-benzothiazin-3-one 1,1-dioxide, 7-nitro-1,4-benzothiazin-3-one 1,1-dioxide, 7-sulfo-1,4-benzothiazin-3-one 1,1-dioxide, 6,7-dimethoxy-1,4-benzothiazin-3-one 1,1-dioxide, 7-methyl-1,4-benzothiazin-3-one 1,1-dioxide, 7-nitro-N-methyl-1,4-benzothiazin-3-one 1,1-dioxide, N-$\beta$-hydroxyethyl-1,4-benzothiazin-3-one 1,1-dioxide, 7-amino-, 7-sulfamoyl-or 7-chlorosulfonyl- or 7-carboxymethylsulfonyl- or 7-acetylamino- or 7-phenylazo-1,4-benzothiazin-3-one 1,1-dioxide, 7-amino-6-phenylazo-1,4-benzothiazin-3-one 1,1-dioxide, 6-amino-7-methyl-1,4-benzothiazin-3-one 1,1-dioxide, 8-chloro- or 8-nitro-N-hydroxyethyl-or -N-$\gamma$-hydroxypropyl-1,4-benzothiazin-3-one 1,1-dioxide, 6-sulfamoyl-1,4-benzothiazin-3-one 1,1-dioxide, 7-chloro-6-sulfamoyl-1,4-benzothiazin-3-one 1,1-dioxide, N-$\gamma$-hydroxypropyl-1,4-benzothiazin-3-one 1,1-dioxide, N-benzyl-1,4-benzothiazin-3-one 1,1-dioxide, 6-amino-1,4-benzothiazin-3-one 1,1-dioxide, 6-trifluoromethyl-1,4-benzothiazin-3-one 1,1-dioxide, 6-chloro,1,4-benzothiazin-3-one 1,1-dioxide.

Compounds of the formula (10) are known for example from: DE-B-No. 1,219,146; Journal of Organic Chemistry in USSR 20 (1984), 2032 ff; Chem. Ber. 98 (1965), 36 ff; Journal of Heterocyclic Chemistry 4 (1967), 403; Friedlander 11, 378; Chem. Ber. 45 (1912), 747 ff; U.S. Pat. No. 2,186,629; Journal of Heterocyclic Chemistry 16 (1979), 1503.

If desired, a free amino group in the radical D or $D_1$ and/or K or $K_1$ can be converted after the coupling by means of an acylating or alkylating agent into an acylamino or alkylamino group; and in the same way a hydroxyl group in the radical D and/or K or $D_1$ and/or $K_1$ can be converted into an alkoxy or acyl group by alkylation or acylation.

A process variant for preparing the heavy metal complex azomethine dyes comprises preparing a heavy metal atom donor not with the azomethine of the formula (1) but with a mixture of the amine of the formula (9) and an aldehyde of the formula (13), (14) or (15).

The amines of the formula (9) and/or (11), the coupling components of the formula (10) and/or (12) and the o-hydroxyaldehydes can contain radicals, for example acetylamino or nitro groups, which are convertible into amino groups. For example, acetylamino and nitro are converted into amino by hydrolysis and reduction respectively, advantageously following the separation of the dyes of the formula (1) or the preparation of the heavy metal complexes.

To prepare the azomethine dyes of the formula (8), the abovementioned aromatic amines of the formula (9) are condensed in a known manner with o-hydroxybenzaldehydes or o-hydroxynaphthaldehydes.

Suitable aldehydes are for example:
2-hydroxybenzaldehyde, 3- or 5-methyl-2-hydroxybenzaldehyde, 3,5-or 3,6-dimethyl-2-hydroxybenzaldehyde, 5-butyl-2-hydroxybenzaldehyde, 5-chloro- or -bromo-2-hydroxybenzaldehyde, 3- or 4-chloro-2-hydroxybenzaldehyde, 3,5-dichloro-2-hydroxybenzaldehyde, 3-chloro-5-methyl-2-hydroxybenzaldehyde, 3-methyl-5-chloro-2-hydroxybenzaldehyde, 3- or 4- or 5-nitro-2-hydroxybenzaldehyde, 3,5-dinitro- or 4-chloro-5-nitro-2-hydroxybenzaldehyde, 4-methoxy-2-hydroxybenzaldehyde, 1-hydroxy-2-naphthaldehyde and the 4-chloro derivative thereof, and 2-hydroxy-1-naphthaldehyde.

The preparation of the 1:1 chromium complexes is carried out by methods known per se. For example, the 1:1 chromium complex of the compound of the formula (1) is prepared by reacting the metal-free compound in an acid medium with a salt of trivalent chromium, such as chromium chloride, chromium fluoride, chromium acetate, chromium formate or chromium sulfate, in the presence or absence of solubility promoters or chroming accelerants, for example alcohols, alkanolamines or hydroxycarboxylic acids. Thereafter, if desired, the 1:1 complex is made to react at pH 5–11 with a compound which introduces the radical of the formula (1) or (8).

The heavy metal complexes according to the invention of azo or azomethine dyes of the formula (1) are suitable for dyeing nitrogen-containing or hydroxyl-containing fibre materials, in particular textile fibre materials made of cellulose, silk and in particular wool and synthetic polyamides, and also leather. Level dyeings are obtained in yellow, brown, orange, red, blue, grey, green and black shades having good allround fastness properties, in particular very good crock, wet, wet crock and light fastness. Furthermore, the dyes according to the invention are very highly compatible with other acid dyes. The abovementioned textile material can be present in a wide range of processed forms, for example as fibre, yarn, woven fabric or knitted fabric.

In the Examples which follow, parts are by weight. The temperatures are degrees centigrade. Parts by weight relate to parts by volume as the gram relates to the cubic centimetre.

Example 1

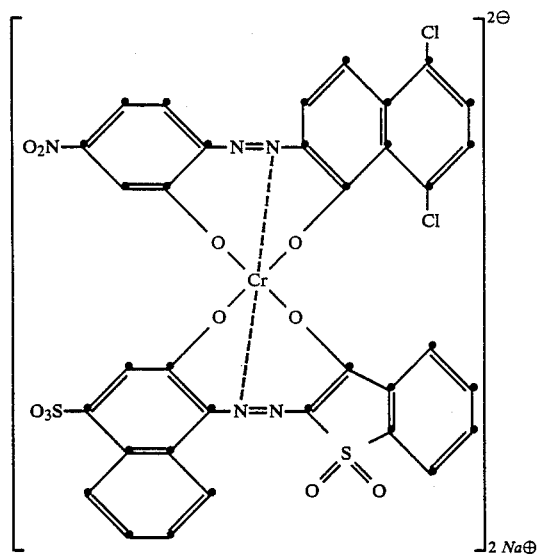

(101)

(a) Coupling 9.56 parts of benzothiophen-3-one 1,1-dioxide are dissolved in 250 parts of water and 10 parts of 5N NaOH at 50°–60° C. and pH 8.5–9.5. While cooling, 12.5 parts of 1-diazonium-2-naphthol-4-sulfonate are added at 10°–15° C. and a constant pH of 8.5–9.5 in the course of 15 minutes. Completion of coupling is followed by addition of sodium chloride, filtration at pH 6.5–7 and washing with sodium chloride solution. Drying at 60°–70° C. in vacuo leaves 28.9 parts of an orange-red azo dye.

(b) Metallization to give the 1:1 chromium complex 9.09 parts of this azo dye are heated at 120°–130° C. in 40 parts of 1,2-dihydroxyethane for 4 hours together with 5.60 parts of $CrCl_3 \times 6\ H_2O$. After cooling down to room temperature the reaction solution is discharged into 25% sodium chloride solution, and the mixture is brought to pH 5 with sodium acetate. The dye crystallizes out, and is filtered off, washed with sodium chloride solution and dried at 60°–70° C.; 12.9 parts of a 1:1 complex which dyes wool in fast blue shades are obtained.

(c) Metallization to give the asymmetric 1:2 chromium complex 2.14 parts of the 1:1 complex and 1.89 parts of the azo dye of the formula

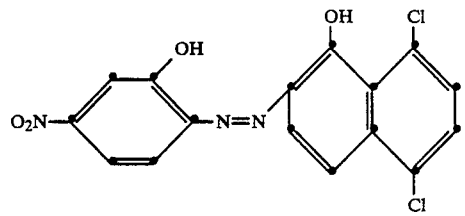

are maintained in 50 parts of water at pH 7–8 and 95°–100° C. for 2 hours. After addition of hydrochloric acid, sodium chloride is added at pH 6.5–7, and the precipitate is filtered off and washed with sodium chloride solution. Drying at 60°–70° C. in vacuo leaves 4.85 parts of the dye of the abovementioned formula (101) which dyes wool and polyamide in fast blue shades.

Example 1 is repeated, except that the azo dye indicated in section (c) is replaced by an equimolar amount of the azo dye of the formula

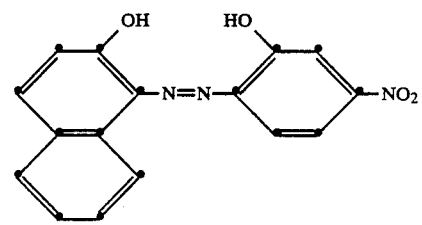

affording the dye of the formula (102)

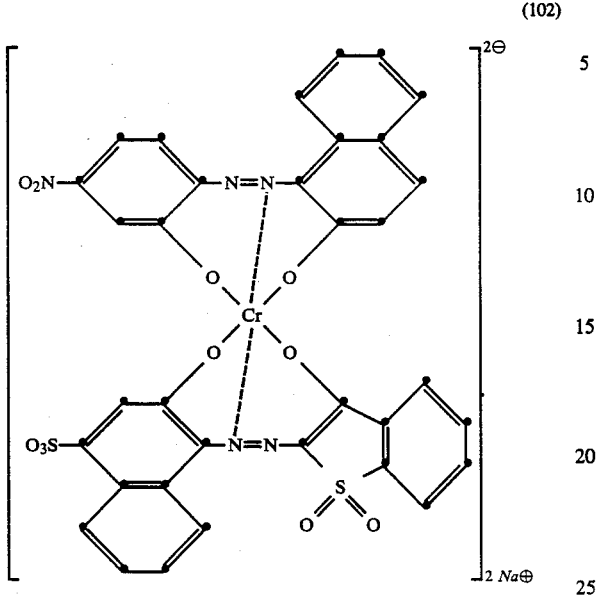

(102)

which dyes wool and polyamide in fast blue shades.

Example 1 is repeated, except that the 1-diazonium-2-naphthol-4-sulfonate indicated in section (a) is replaced by an equimolar amount of the diazonium salt of one of the amines indicated in column 2 of Table 1 below, affording azo dyes which, upon metallization as indicated in section (b) of Example 1, give 1:1 chromium complexes which dye wool in the hue indicated in column 3.

TABLE 1

| Example | Amine | Hue |
|---|---|---|
| 2 | (2-amino-4-nitrophenol) | reddish violet |
| 3 | (2-amino-4-nitrophenol-6-sulfonic acid) | violet |
| 4 | (diamino-naphthol-sulfonic acid) | greenish blue |
| 5 | (amino-naphthol-sulfonic acid with CHBr—CH₂Br amide) | greenish blue |
| 6 | (4-amino-7-nitro-3-hydroxynaphthalene-1-sulfonic acid) | navy |
| 7 | (2-amino-5-sulfo-benzoic acid) | yellow |

If the 1:1 chromium complex of Table 1, Example 6, is reacted in accordance with the directions of section (c) of Example 1 to give the 1:2 chromium complex and if instead of the azo dye indicated therein an equimolar amount of the azo dye of the formula

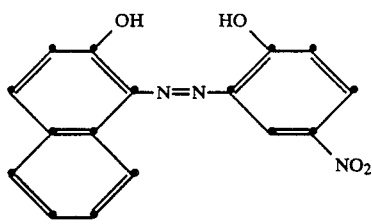

or of the azo dye of the formula

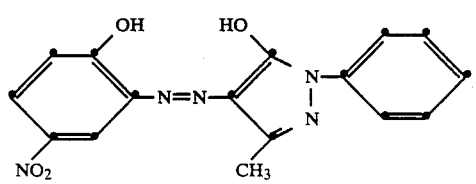

is used, either the dye of the formula (103)

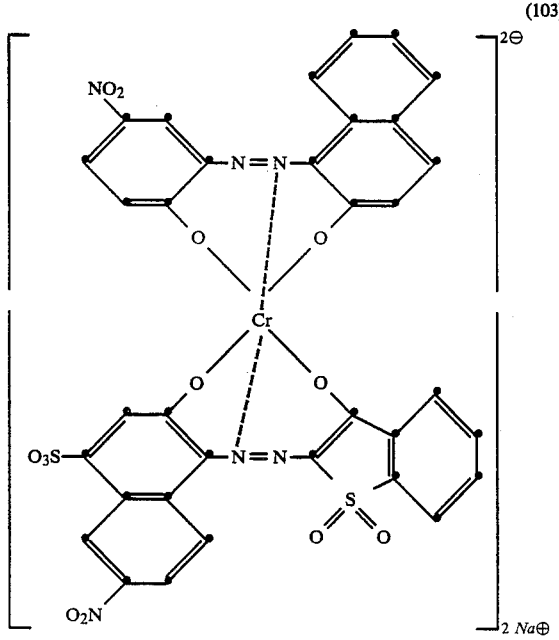

(103)

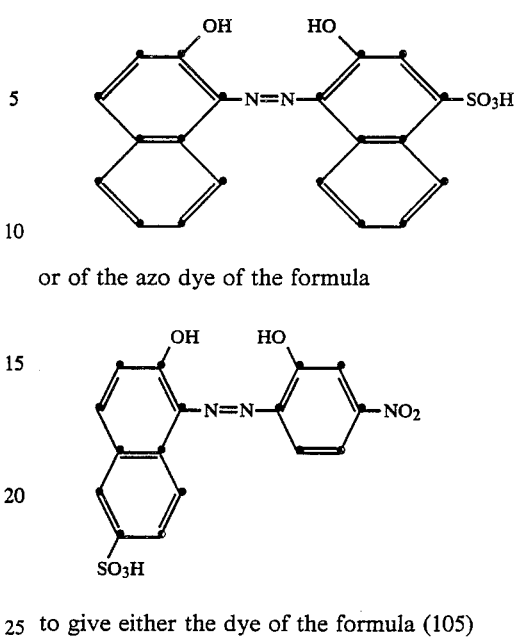

or of the azo dye of the formula to give either the dye of the formula (105) which dyes wool and polyamide in fast grey shades, or the dye of the formula (104)

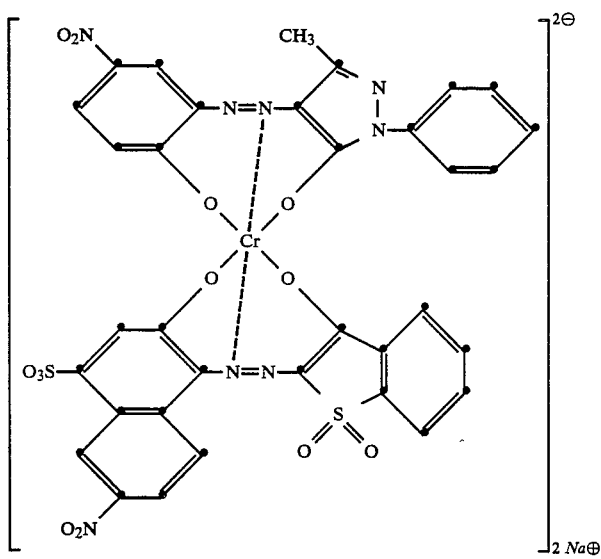

(104)

which dyes wool and polyamide in fast brown shades is obtained.

Example 1 is repeated, except that in section (a) the diazo component used is an equimolar portion of 5-nitro-1,2-benzoquinone diazide, affording an azo dye which, upon metallization as described in section (b), gives a 1:1 chromium complex.

This 1:1 chromium complex is reacted as described in section (c) with an equimolar amount of the azo dye of the formula

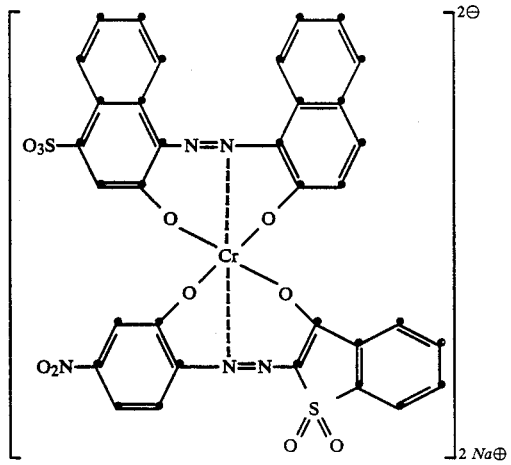

which dyes wool or polyamide in fast navy shades, or the dye of the formula (106)

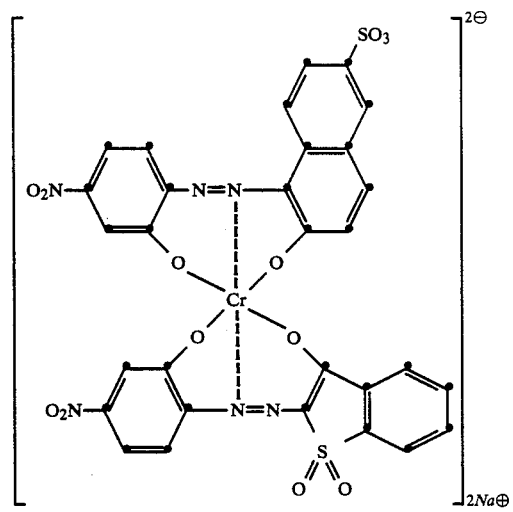

which dyes wool and polyamide in fast navy shades.

Example 8

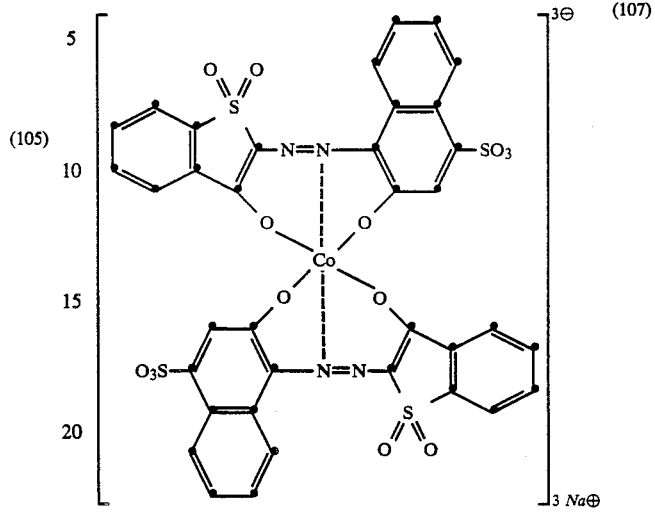

9.56 parts of benzothiophen-3-one 1,1-dioxide are dissolved in 250 of water and 10 parts of 5N NaOH at 50°-60° C. and pH 8.5-9.5. While cooling, 12.5 parts of 1-diazonium-2-naphthol-4-sulfonate are added at 10°-15° C. and a constant pH of 8.5-9.5 in the course of 15 minutes. The completion of coupling is followed by addition of sodium chloride, filtration at pH 6.5-7 and washing with sodium chloride solution. Drying at 60°-70° C. in vacuo leaves 28.9 parts of an orange-red azo dye.

2.27 parts of this azo dye are heated at 80°-90° C. in 50 parts of water at pH 8-9 together with 2.5 parts of a 1 molar CoSO$_4$ solution for 30 minutes. After cooling down, the reaction solution is brought to pH 7-7.5 and evaporated. 3.4 parts are obtained of the dye of the formula (107) which dyes wool and polyamide in fast violet shades.

Example 8 is repeated, using in place of 1-diazonium-2-naphthol-4-sulfonate an equimolar amount of the diazonium salt of one of the amines indicated in column of Table 2 below. Symmetrical 1:2 cobalt complex dyes are obtained, which dye wool and polyamide in the hue indicated in column 3.

TABLE 2

| Example | Amine | Hue |
|---|---|---|
| 9 | ![OH, NH2, O2N, SO3H substituted benzene] | red |
| 10 | ![NH2, OH, O2N, SO3H substituted naphthalene] | bordeaux |

TABLE 2-continued

| Example | Amine | Hue |
|---------|-------|-----|
| 11 | 2-amino-4-nitrophenol (OH, NH₂, O₂N) | purple |
| 12 | 2-amino-6-nitro-4-sulfophenol (OH, O₂N, NH₂, SO₃H) | violet |
| 13 | 1-amino-2-hydroxy-6-amino-4-sulfonaphthalene (NH₂, OH, H₂N, SO₃H) | blue |
| 14 | 1-amino-4-(2,3-dibromopropionylamino)-2-hydroxy-sulfonaphthalene (NH₂, OH, HN-CO-CHBr-CH₂Br, SO₃H) | reddish blue |
| 15 | 2-amino-4-(N-(2-methoxyethyl)sulfamoyl)phenol (OH, NH₂, SO₂-NH-(CH₂)₂-OCH₃) | bordeaux |
| 16 | 2-amino-5-sulfobenzoic acid (COOH, NH₂, HO₃S) | yellow |

Example 17

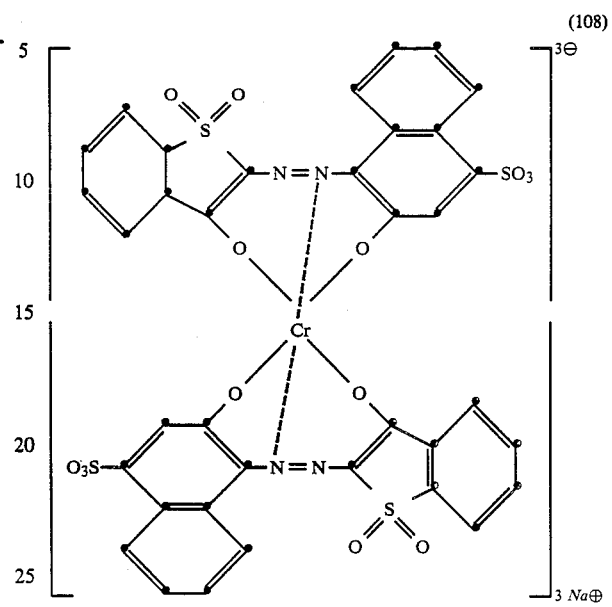

(108)

9.56 parts of benzothiophen-3-one, 1,1-dioxide are dissolved in 250 parts of water and 10 parts of 5N NaOH at 50°–60° C. and pH 8.5–9.5. While cooling, 12.5 parts of 1-diazonium-2-naphthol-4-sulfonate are added at 10°–15° C. and a constant pH of 8.5–9.5 in the course of 15 minutes. The completion of coupling is followed by addition of sodium chloride, filtration at pH 6.5–7 and washing with sodium chloride solution. Drying at 60°–70° C. in vacuo leaves 28.9 parts of an orange-red azo dye.

2.27 parts of this azo dye are heated at 95° to 100° C. in 50 parts of water and 6.2 parts of a 0.41 molar sodium chromosalicylate solution at a pH of 8 to 9. Evaporation of the reaction solution leaves 4.6 parts of the dye of the formula (108) which dyes wool and polyamide in fast blue shades.

Example 17 is repeated, except that the 1-diazonium-2-naphthol-4-sulfonate is replaced by an equimolar amount of the diazonium salt of one of the amines indicated in column 2 of Table 3 below, affording symmetrical 1:2 chromium complex dyes which dye wool and polyamide in the hue indicated in column 3.

TABLE 3

| Example | Amine | Hue |
|---------|-------|-----|
| 18 | 2-amino-4-nitrobenzyl (OH, NH₂, O₂N) | purple-violet |
| 19 | 2-amino-4-nitro-6-sulfophenol (OH, NH₂, O₂N, SO₃H) | violet |

TABLE 3-continued

| Example | Amine | Hue |
|---|---|---|
| 20 | (structure: 1,6-diamino-3-hydroxy-naphthalene sulfonic acid) | greenish blue |
| 21 | (structure: amino-hydroxy-naphthalene with HN-CO-CHBr-CH₂Br and SO₃H) | grey |
| 22 | (structure: amino-hydroxy-nitro-naphthalene sulfonic acid) | grey |
| 23 | 2-amino-5-sulfobenzoic acid | yellow |
| 24 | 2-amino-4-nitro-6-sulfo phenol (O₂N, OH, NH₂, SO₃H) | violet |

Example 25

(109)

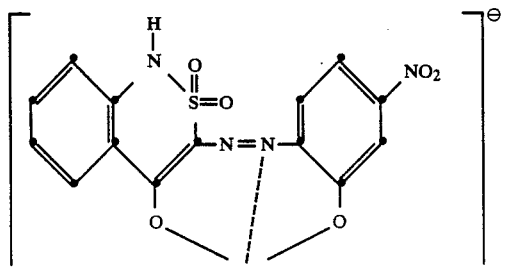

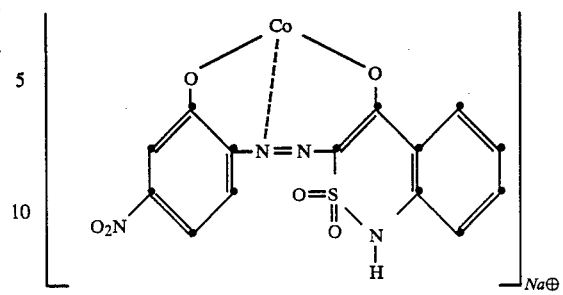

1.54 parts 2-amino-5-nitrophenol are diazotized and the diazotization solution is added dropwise to a solution of 2.17 parts of 2,1-benzothiazin-4-one 2,2-dioxide in 20 parts of water at pH 9 and 10°-15° C. After the coupling has ended, sodium chloride is added and the precipitate is filtered off. Washing with sodium chloride solution and drying at 60°-70° C. in vacuo leaves 5.45 parts of a red azo dye.

1.09 parts of this azo dye are dissolved in 40 parts of water at pH 8-9, and 16 parts of a 0.1 molar CoSO₄ solution are added at 70°-80° C. in the course of 15 minutes. Completion of complex formation is followed by addition of sodium chloride, filtration at pH 7-7.5 and washing with sodium chloride solution. Drying at 60°-70° C. in vacuo leaves 1.6 parts of a bordeaux-red dye of the above-indicated formula (109), which dyes wool and polyamide in fast violet shades.

Example 25 is repeated, except that in place of 2-amino-5-nitrophenol an equimolar amount of 2-amino-4-sulfo-6-nitrophenol is used, affording a symmetrical 1:2 cobalt complex dye which dyes wool and polyamide in fast bordeaux shades.

Example 26

(110)

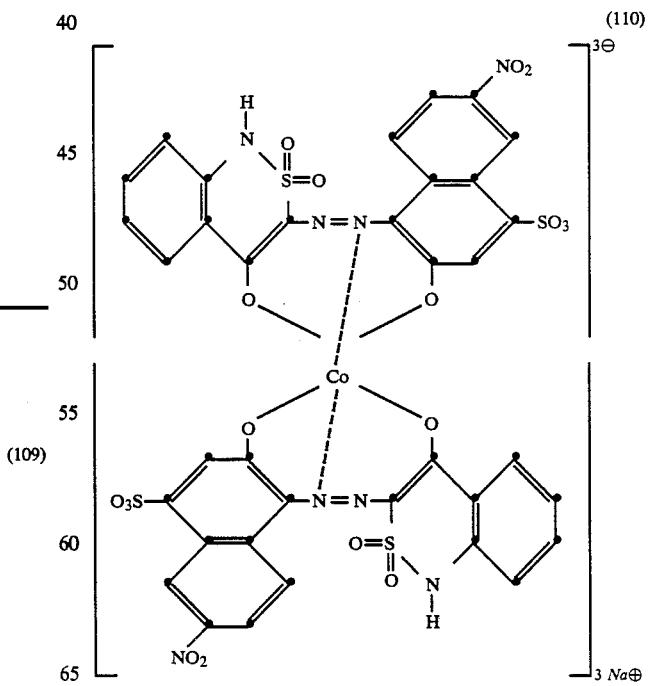

2.07 parts of 2,1-benzothiazin-4-one 2,2-dioxide are dissolved in 40 parts of water at a pH of 7 to 8 by addition of sodium hydroxide solution. After cooling down to 10° C., 2 parts of calcium hydroxide and 2.95 parts of 1-diazoniua-6-nitro-2-naphthol-4-sulfonate are added. Following completed coupling at a pH of 11 to 12, calcium is removed, sodium chloride is added at a pH of 5 to 6, the mixture is filtered, and the filtered residue is washed with sodium chloride solution. Drying at 60° to 70° C. in vacuo leaves 3.0 parts of a red azo dye.

0.52 parts of this azo dye are dissolved in 40 parts of water at pH 8–9, and 6 parts of a 0.1 molar CoSO4 solution are added at 70°–80° C. in the course of 15 minutes. After complexation has ended, the reaction solution is brought to pH 7–7.5 and evaporated. 1.1 parts are obtained of a bordeaux-red dye of the above-indicated formula (110), which dyes wool and polyamide in fast bordeaux shades.

Example 2

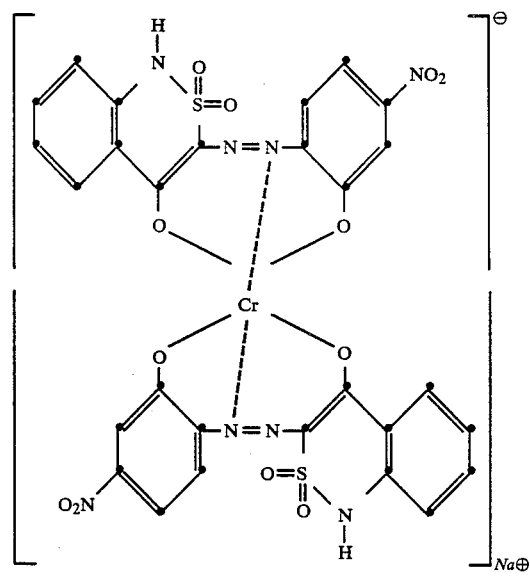

1.54 parts of 2-amino-5-nitrophenol are diazotized, and the diazotization solution is added dropwise at pH 9 and 10°–15° C. to a solution of 2.17 parts of 2,1-benzothiazin-4-one 2,2-dioxide in 20 parts of water. Completion of coupling is followed by addition of sodium chloride and filtration. Washing with sodium chloride solution and drying at 60°–70° C. in vacuo leaves 5.45 parts of a red azo dye.

1.09 parts of this azo dye are dissolved in 40 parts of water at pH 8 by addition of sodium hydroxide solution and heated under reflux for 2 hours together with 4.2 parts of a 0.395 molar sodium chromosalicylate solution. The reaction solution is then brought to a pH of 7 to 7.5, and the reaction product is salted out with sodium chloride, filtered off, washed with sodium chloride solution and dried at 60° to 70° C. in vacuo. 1.23 parts are obtained of the dye of the formula (111), which dyes wool and polyamide in fast blue shades.

Example 27 is repeated, except that instead of 2-amino-5-nitrophenol an equimolar amount of one of the amines indicated in column 2 of Table 4 below is used, affording symmetrically 1:2 chromium complex dyes which dye wool and polyamide in the hue indicated in column 3.

TABLE 4

| Example | Amine | Hue |
|---|---|---|
| 28 | $O_2N$—phenol with OH, $NH_2$, $SO_3H$ | violet |
| 29 | phenol with OH, $NH_2$, $H_2N$ | bluish grey |
| 30 | phenol with OH, $NH_2$, HN—CO—CHBr—$CH_2$Br | grey |

Example 31

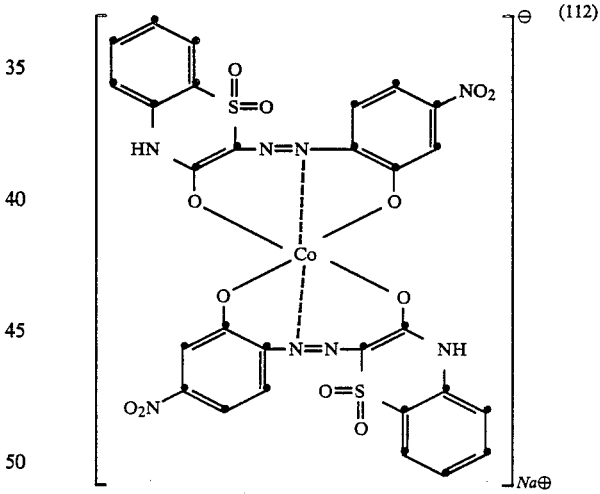

1.54 parts of 2-amino-5-nitrophenol are diazotized, and the diazotization solution is added dropwise at 10° C. to a suspension of 2.07 parts of 1,4-benzothiazin-3-one 1,1-dioxide in 25 parts of water and 0.8 part of 2N sodium hydroxide solution in the course of 15 minutes, during which the pH is maintained at 9 to 11. After the coupling has ended, the pH is reduced with hydrochloric acid to 7–7.5. The orange-red dye is filtered off and washed with sodium chloride solution. Drying at 60°–70° C. in vacuo leaves 2.68 parts of an azo dye.

1.09 parts of this azo dye are dissolved at 70°–80° C. in 40 parts of water, and 18 parts of 0.1 molar CoSO4 solution are added; during the addition, pH 9 is maintained with sodium carbonate. The dye is precipitated at 60° C. by addition of sodium chloride, filtered off and washed with sodium chloride solution.

Drying at 60°–70° C. in vacuo leaves 1.02 parts of dye of the above-indicated formula (112), which dyes wool and polyamide in fast red shades.

Example 31 is repeated, except that in place of 2-amino-5-nitrophenol an equimolar amount of one of the amines indicated in column 2 of Table 5 below is used and in place of 1,4-benzothiazin-3-one 1,1-dioxide an equimolar amount of one of the coupling components indicated in column 3, affording symmetrical 1:2 cobalt complex dyes which dye wool and polyamide in the hue indicated in column 4.

TABLE 5

| Example | Amine | Coupling component | Hue |
|---|---|---|---|
| 32 | (OH, HO₃S, NH₂, Cl substituted benzene) | 1,4-benzothiazin-3-one 1,1-dioxide (HO-) | orange |
| 33 | (1-amino-2-hydroxy-4-sulfonaphthalene) | 1,4-benzothiazin-3-one 1,1-dioxide (HO-) | red |
| 34 | (2-amino-4-nitrophenol) | 1,4-benzothiazin-3-one 1,1-dioxide (HO-) | brownish orange |
| 35 | (OH, NH₂, O₂N, SO₃H substituted benzene) | 1,4-benzothiazin-3-one 1,1-dioxide (HO-) | orange |
| 36 | (OH, HO₃S, NH₂, NO₂ substituted benzene) | 1,4-benzothiazin-3-one 1,1-dioxide (HO-) | orange |
| 37 | (NH₂, OH, O₂N, SO₃H substituted naphthalene) | 1,4-benzothiazin-3-one 1,1-dioxide (HO-) | orange |

TABLE 5-continued
| Example | Amine | Coupling component | Hue |
|---|---|---|---|
| 38 | 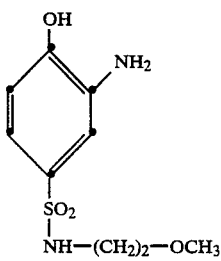 | 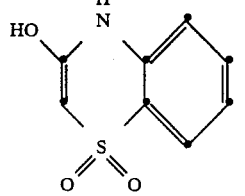 | orange |
| 39 | 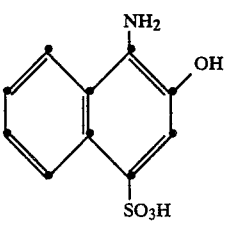 | 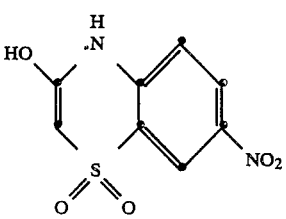 | olive |
| 40 | 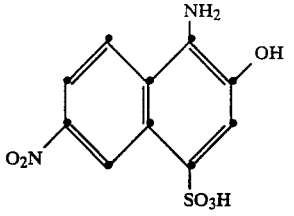 | 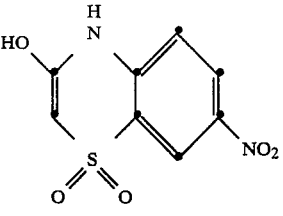 | orange |
| 41 | 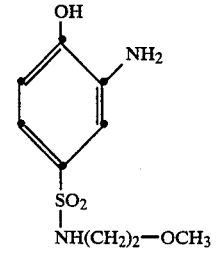 | 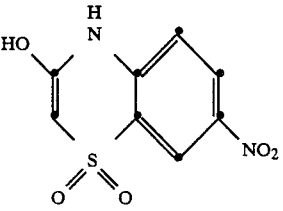 | orange |
| 42 | 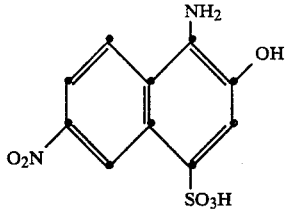 | 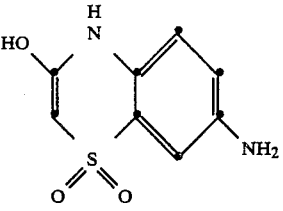 | orange |
| 43 | 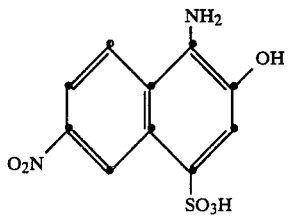 | 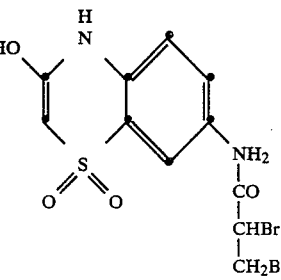 | orange |

TABLE 5-continued

| Example | Amine | Coupling component | Hue |
|---|---|---|---|
| 44 | 4-amino-3-hydroxy-7-amino-naphthalene-1-sulfonic acid | 2-hydroxy-5-amino-acetoacetanilide sulfone derivative | bordeaux |
| 45 | 4-amino-3-hydroxy-7-(dibromopropionylamino)-naphthalene-1-sulfonic acid | 2-hydroxy-5-(dibromopropionylamino)-acetoacetanilide sulfone derivative | bordeaux |
| 46 | 2-amino-4-(N-(2-methoxyethyl)sulfamoyl)phenol | 2-hydroxy-5-amino-acetoacetanilide sulfone derivative | orange |
| 47 | 2-amino-4-(N-(2-methoxyethyl)sulfamoyl)phenol | 2-hydroxy-5-(dibromopropionyloxyamino)-acetoacetanilide sulfone derivative | orange |
| 48 | 2-amino-4-sulfo-6-nitrophenol | 2-hydroxy-acetoacetanilide sulfone derivative | orange |

Example 49

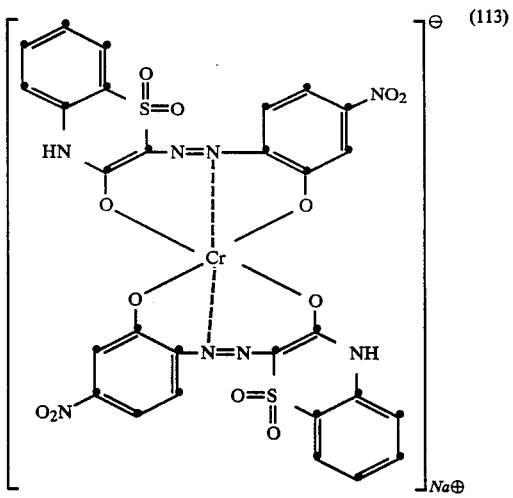

1.54 parts of 2-amino-5-nitrophenol are diazotized, and the diazotization solution is added dropwise at 10° to a suspension of 2.07 parts of 1,4-benzothiazin-3-one 1,1-dioxide in 25 parts of water and 0.8 part of 2N sodium hydroxide solution in the course of 15 minutes, during which the pH is maintained at 9 to 11. After the coupling has ended, the pH is reduced with hydrochloric acid to 7-7.5. The orange-red dye is filtered off and washed with sodium chloride solution. Drying at 60°-70° C. in vacuo leaves 2.68 parts of an azo dye.

1.09 parts of this azo dye are suspended in 40 parts of water at pH 8 or 9 by addition of sodium carbonate solution and complexed at 95° to 100° C. with 4.2 parts of a 0.395 molar sodium chromosalicylate solution. After the reaction has ended, sodium chloride is added to salt out the reaction product, which is filtered off at a pH of 7 to 7.5, washed with sodium chloride solution and then dried at 60° to 70° C. in vacuo. 1.4 parts are obtained of the dye of the formula (113), which dyes wool and polyamide in fast red shades.

Example 49 is repeated, except that in place of 2-amino-5-nitrophenol an equimolar amount of one of the amines indicated in column 2 of Table 6 below and in place of 1,4-benzothiazin-3-one 1,1-dioxide an equimolar amount of one of the coupling components indicated in column 3 is used, affording symmetrical 1:2 chromium complex dyes which dye wool and polyamide in the hue indicated in column 4.

TABLE 6

| Example | Amine | Coupling component | Hue |
|---|---|---|---|
| 50 | (OH, HO₃, NH₂, Cl-substituted benzene) | (benzothiazine sulfone, HO, H, N) | red |
| 51 | (NH₂, OH, SO₃H-substituted naphthalene) | (benzothiazine sulfone, HO, H, N) | bordeaux |
| 52 | (OH, NH₂, NO₂-substituted benzene) | (benzothiazine sulfone, HO, H, N) | orange |
| 53 | (OH, NH₂, O₂N, SO₃H-substituted benzene) | (benzothiazine sulfone, HO, H, N) | orange |

TABLE 6-continued

| Example | Amine | Coupling component | Hue |
|---|---|---|---|
| 54 | 2-amino-6-nitro-phenol-4-sulfonic acid (OH, NH₂, HO₃S, NO₂ substituted benzene) | HO-C(CH₃)=CH-SO₂-C₆H₄-CH₃ (acetoacetyl-toluidide sulfone type) | orange |
| 55 | 1-amino-2-hydroxy-6-nitro-naphthalene-4-sulfonic acid | HO-C(CH₃)=CH-SO₂-C₆H₄-CH₃ | red |
| 56 | 4-hydroxy-3-amino-benzenesulfonic acid N-(2-methoxyethyl)amide | HO-C(CH₃)=CH-SO₂-C₆H₄-CH₃ | orange |
| 57 | 1-amino-2-hydroxy-naphthalene-4-sulfonic acid | HO-C(CH₃)=CH-SO₂-C₆H₄-NO₂ | orange |
| 58 | 1-amino-2-hydroxy-6-nitro-naphthalene-4-sulfonic acid | HO-C(CH₃)=CH-SO₂-C₆H₄-NO₂ | red |
| 59 | 2-amino-6-nitro-phenol-4-sulfonic acid | HO-C(CH₃)=CH-SO₂-C₆H₄-CH₃ | orange |
| 60 | 1-amino-2-hydroxy-6-nitro-naphthalene-4-sulfonic acid | HO-C(CH₃)=CH-SO₂-C₆H₄-NH₂ | red |

TABLE 6-continued

| Example | Amine | Coupling component | Hue |
|---|---|---|---|
| 61 | 1-amino-2-hydroxy-6-nitro-4-sulfonaphthalene | 4-(α,β-dibromopropionylamino)phenyl β-hydroxyethyl sulfone (coupled form) | bordeaux |
| 62 | 1-amino-2-hydroxy-6-amino-4-sulfonaphthalene | 4-aminophenyl β-hydroxyethyl sulfone (coupled form) | violet |
| 63 | 1-amino-2-hydroxy-6-(α,β-dibromopropionylamino)-4-sulfonaphthalene | 4-(α,β-dibromopropionylamino)phenyl β-hydroxyethyl sulfone (coupled form) | violet |

Example 64

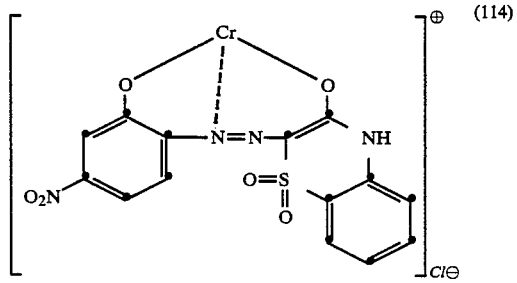

1.54 parts of 2-amino-5-nitrophenol are diazotized, and the diazotization solution is added dropwise at 10° to a suspension of 2.07 parts of 1,4-benzothiazin-3-one 1,1-dioxide in 25 parts of water and 0.8 part of 2N sodium hydroxide solution in the course of 15 minutes, during which the pH is maintained at 9 to 11. After the coupling has ended, the pH is reduced with hydrochloric acid to 7–7.5. The orange-red dye is filtered off and washed with sodium chloride solution. Drying at 60°–70° in vacuo leaves 2.68 parts of an azo dye.

1.09 parts of this azo dye are heated for 4 hours at 120° to 130° C. in 25 parts of 1,2-dihydroxyethane together with 0.84 part of $CrCl_3 \times 6H_2O$. After cooling down to room temperature, the reaction solution is discharged onto 25% sodium chloride solution, and the reaction product is filtered off and washed with sodium chloride solution. The drying in vacuo at 60° to 70° C. leaves 0.783 parts of the red 1:1 chromium complex dye of the formula (114), which dyes wool in red shades.

Example 64 is repeated, except that in place of diazotized 2-amino-5-nitrophenol an equimolar amount of 1-diazonium-2-naphthol-4-sulfonate is used, affording a bordeaux-red dye, which dyes wool in bordeaux shades.

To prepare the fibre-reactive metal complexes of Examples 5, 14, 21, 30, 43, 45, 47, 61 and 63, the metal complexes having a free amino group are prepared and then reacted with α,β-dibromopropionyl chloride in the following manner:

After the metallization the solution is cooled down to about 10° to 15° and brought to pH 7 to 7.5. α,β-dibromopropionyl chloride is then added dropwise in the course of 10 to 15 minutes in such an amount that a 10% excess is present, the pH being constantly maintained between 6.5 and 7.5 with dilute sodium hydroxide solution. This is followed by stirring for an hour at 10° to 15°, and the temperature is then allowed to rise to room temperature. The acylated dye is precipitated by addition of sodium chloride, washed with aqueous sodium chloride solution and dried at 50° to 60° in a vacuum drying cabinet.

Dyeing Example 1

100 parts of wool knitting yarn are introduced into a dyebath which consists of 4,500 parts of water at 40° C., 3 parts of ammonium sulfate and 1 part of the dye described in Example 26. The temperature of the dyebath is raised to 98° C. in the course of 45 minutes and maintained at that level for one hour. After cooling down, the wool yarn is rinsed and dried. It has been dyed in a full wet- and light-fast bordeaux shade.

Dyeing Example 2

A dyebath which consists of 4,500 parts of water at 40° C., 3 parts of ammonium sulfate and 1 part of the dye mentioned in Example 25 is entered with 100 parts of a fabric made of nylon-6.6 textured fibres. The dyebath is raised to the boil in the course of 45 minutes and is maintained at the boil for 1 hour. After cooling down, rinsing and drying a violet-coloured substrate having good wet fastnesses and good light fastness is obtained.

Dyeing Example 3

A dyebath which contains, on top of 4,500 parts of fully demineralized water, 1 part of the chromium complex mentioned in Example 33, 1 part of ammonium acetate and sufficient 40% acetic acid to set a pH of 4.5 is entered at a temperature of 40° C. with 100 parts of a textured fabric made of nylon-6.6. The dyebath is raised to the boil in the course of 45 minutes and dyeing is continued at the boil for one hour. After cooling down, thorough rinsing and drying the polyamide fabric has a uniform, wet- and light-fast red colour.

Dyeing Example 4

100 parts of wool knitting yarn are introduced into a dyebath which consists of 4,500 parts of water at 40° C., 0.5 part of 80% acetic acid and 1 part of the dye described in Example 31. The temperature of the dyebath is raised to 98° C. in the course of 45 minutes and is maintained at that level for 1 hour. After cooling down, the wool knitting yarn is rinsed hot and cold and dried. It has been dyed in a full red shade.

Dyeing Example 5

100 parts of wool knitting yarn are introduced into a dyebath which consists of 4,500 parts of water at 40° C., 0.5 part of 80% acetic acid and 1 part of the dye described in Example 1. The temperature of the dyebath is raised to 98° C. in the course of 45 minutes and is maintained at that level for one hour. After cooling down, the wool knitting yarn is rinsed hot and cold and dried. It has been dyed in a full wet- and light-fast blue shade.

Dyeing Example 6

100 parts of wool knitting yarn are introduced into a dyebath which consists of 4,500 parts of water at 40° C., 5 parts of sodium sulfate, 4 parts of 96% sulfuric acid and 1 part of the 1:1 chromium complex dye described in section b) of Example 1. The temperature of the dyebath is raised to 98° C. in the course of 40 minutes and is maintained at that level for 90 minutes. After cooling down, the wool yarn is rinsed and dried. It has been dyed in a full, wet- and light-fast blue shade.

Dyeing Example 7

4 parts of 80% acetic acid, 2 parts of the ammonium salt of the acid sulfuric acid ester of the adduct of a fatty amine (consisting of 30% of hexadecylamine, 25% of octadecylamine and 45% of octadecenylamine and 7 moles of ethylene oxide) and also 4 parts of ammonium sulfate are dissolved in succession in 1,000 parts of water at 50°.

3 parts of the dye obtained as per Example 61 of Table 6 are dissolved in 100 parts of hot water, and the solution is added to the above dyebath. A circulation dyeing apparatus is charged with 100 parts of pre-wetted slubbing in package form, the temperature of the bath is raised from 50° to 97°–99° in the course of 30 minutes, and dyeing is then continued at the boil for 90 minutes. The dye exhausts almost completely onto the substrate. After cooling down the bath to 80°, the pH of about 4.5 is raised to a permanent 8.5 by adding ammonia solution, and the dyed material is aftertreated at that temperature. Thorough rinsing with hot and cold water, acidifying with 1 part of 80% formic acid, centrifuging and drying gives a red-dyed material of very good wet fastness and also excellent light fastness.

What is claimed is:

1. A heavy metal complex of an azo or azomethine dye of the formula

in which $D-(CO)_n-OH$ is an aminophenol, aminonaphthol or aminobenzoic acid diazo component, which, in addition to the metallizable group, is unsubstituted or substituted by $C_1-C_8$-alkyl, $C_1-C_8$-alkoxy, $C_2-C_8$-alkanoylamino, $C_2-C_8$-alkoxycarbonylamino, benzoylamino, amino, mono- or dialkylamino having 1 to 8 carbon atoms in the alkyl radical, phenylamino, alkoxycarbonyl having 1 to 8 carbon atoms in the alkoxy radical, nitro, cyano, trifluoromethyl, halogen, sulfamoyl, sulfamoyl which is monosubstituted or disubstituted on the nitrogen atom by $C_1-C_4$-alkyl, $C_1-C_4$-alkoxy-$C_1-C_4$alkyl, hydroxy-$C_1-C_4$-alkyl, $C_5-C_7$-cycloalkyl or phenyl, carbamoyl, ureido, hydroxyl, $C_1-C_8$-alkyl-sulfonyl, phenylsulfonyl, carboxyl, sulfomethyl, sulfo, phenylazo, naphthylazo or a fibre-reactive acryloyl, mono-, di- or trihalo-acryloyl or -methacryloyl, mono- or dihalopropionyl, phenylsulfonylpropionyl, vinylsulfonylpropionyl, β-chloroethylsulfonylpropionyl, methysulfonylpropionyl or 62 -sulfatoethylsulfonyl, mono-, di- or trihalopyrimidyl or mono- or dihalotriazinyl radical, which is bonded directed or via $-NH-$, $-N(CH_3)-$, $-N(C_2H_5)-$, $-N(C_3H_7)-$,

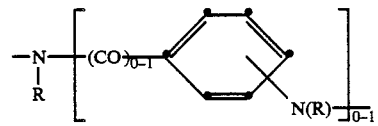

or $-CH_2-N(R)-$, where R is hydrogen, $C_1-C_4$-alkyl, $C_1-C_4$-alkyl substituted by hydroxyl, $C_1-C_4$-alkoxy, phenyl, sulfo, sulfato or halogen, phenyl or phenyl substituted by $C_1-C_4$-alkyl, $C_1-C_4$-alkoxy, $C_2-C_6$-alkanoylamino, sulfo or halogen, K—OH is the radical of the formula

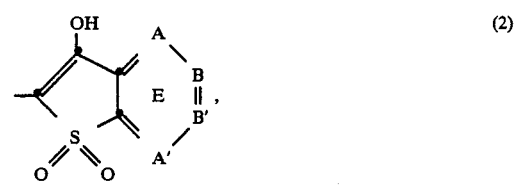

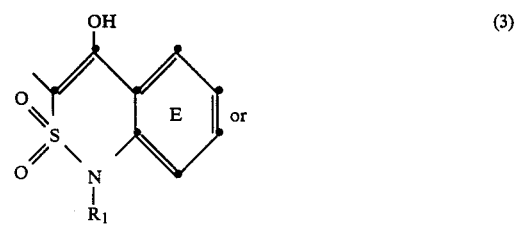

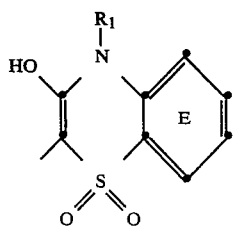 (4)

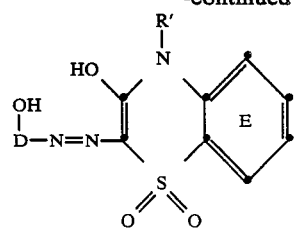 (7)

in which the symbols A, A', B and B' each represent a carbon atom or in which one of the symbols A, A', B or B' represents a nitrogen atom while the others represent a carbon atom, $R_1$ has the meaning given for R or $R_1$ is a fibre-reactive radical given for D, the ring E is unsubstituted or substituted by the substituents given for d, Y is a nitrogen atom or a CH group, and n is 0 or 1, and in which $-(CO)_n$—OH is bonded to D in a position adjacent to —N=Y—.

2. A heavy metal complex according to claim 1, which contains as the heavy metal a copper, nickel, iron, cobalt or chromium atom.

3. A heavy metal complex according to claim 2, wherein two molecules of the azo or azomethine dye of the formula (1) are bonded to one atom of nickel or cobalt.

4. A heavy metal complex according to claim 2, wherein one or two molecules of the azo or azomethine dye of the formula (1) is or are bonded to one atom of chromium.

5. A heavy metal complex according to claim 1, wherein one molecule of the azo or azomethine dye of the formula (1) and one molecule of another metallizable azo or azomethine dye are bonded to one atom of chromium.

6. A heavy metal complex according to claim 1, wherein Y is a nitrogen atom.

7. A heavy metal complex according to claim 1, wherein the symbols A, A', B and B' each represent a carbon atom.

8. A heavy metal complex according to claim 1, wherein A, A' and B are each a carbon atom and B' is a nitrogen atom.

9. A heavy metal complex according to claim 1, wherein the azo or azomethine dye of the formula (1) contains no, one or two sulfo groups.

10. A heavy metal complex according to claim 1 of an azo dye of the formula

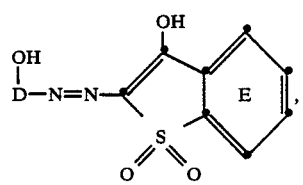 (5)

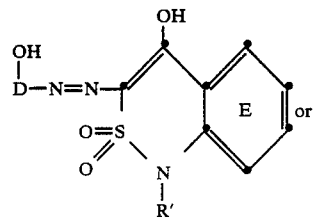 (6) or in which D is phenyl or naphthyl which is unsubstituted or substituted by $C_1$–$C_4$alkyl, $C_1$–$C_4$alkoxy, $C_2$–$C_6$alkanoylamino, $C_1$–$C_6$alkoxycarbonylamino, benzoylamino, amino, mono- or dialkylamino having in each case 1 to 4 carbon atoms in the alkyl radical, phenylamino, $C_1$–$C_4$alkoxycarbonyl, nitro, cyano, trifluoromethyl, halogen, sulfamoyl, $C_1$–$C_4$alkyl- or $C_1$–$C_4$alkoxy-$C_1$–$C_4$alkyl-substituted sulfamoyl, carbamoyl, ureido, hydroxyl $C_1$–$C_4$alkylsulfonyl, carboxyl, sulfomethyl, sulfo, phenylazo or a fibre-reactive radical given for D in claim 21, or D—OH is a carboxyphenyl radical which is unsubstituted or substituted by the abovementioned substituents, R' is hydrogen or $C_1$–$C_4$alkyl, and the benzo ring E is unsubstituted or substituted by $C_1$–$C_4$alkyl, $C_1$–$C_4$alkoxy, $C_2$–$C_6$alkanoylamino, $C_1$–$C_6$alkoxycarbonylamino, benzoylamino, amino, mono- or dialkylamino having in each case 1 to 4 carbon atoms in the alkyl radical, phenylamino, $C_1$–$C_4$alkoxycarbonyl, nitro, cyano, trifluoromethyl, halogen, sulfamoyl, carbamoyl, ureido, hydroxyl, $C_1$–$C_4$alkylsulfonyl, carboxyl, sulfomethyl, sulfo, a fibre-reactive radical given for D in claim 21 or phenylazo, and in which the hydroxyl group in D is in the o-position relative to the azo group.

11. A heavy metal complex according to claim 10, which contains as the heavy metal a cobalt or a chromium atom.

12. A heavy metal complex according to claim 11, wherein two molecules of the azo dye of the formula (5), (6) or (7) are bonded to one atom of cobalt.

13. A heavy metal complex according to claim 11, wherein one molecule of the azo dye of the formula (5), (6) or (7) and one molecule of the azo dye of the formula

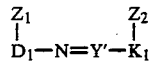 (8)

in which in the formula (8) $D_1$ is phenyl or naphthyl which is unsubstituted or substituted by $C_1$–$C_4$alkyl, $C_1$–$C_4$alkoxy, $C_2$–$C_6$alkanoylamino, $C_1$–$C_6$alkoxycarbonylamino, benzoylamino, amino, mono- or dialkylamino having in each case 1 to 4 carbon atoms in the alkyl radical, phenylamino, $C_1$–$C_4$alkoxycarbonyl, nitro, cyano, trifluoromethyl, halogen, sulfamoyl, carbamoyl, ureido, hydroxyl, $C_1$–$C_4$alkylsulfonyl, carboxyl, sulfomethyl, sulfo, phenylazo or a fibre-reactive acryloyl, mono-, di- or trihaloacryloyl or -methacryloyl, mono- or dihalopropionyl, phenylsulfonylpropionyl, vinylsulfonylpropionyl, β-chloroethylsulfonylpropionyl, methylsulfonylpropionyl or β- sulfatoethylsulfonyl, mono-, di- or trihalopyrimidyl or mono- or dihalotriazinyl radical which is bonded directly or via —NH—, —N(CH$_3$)—, —N(C$_2$H$_5$)—, —N(C$_3$H$_7$)—,

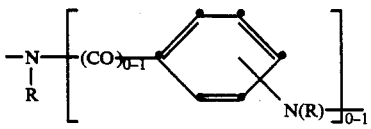

or —CH$_2$—N(R)—, where R is hydrogen, C$_1$–C$_4$-alkyl, C$_1$–C$_4$-alkyl substituted by hydroxyl, C$_1$–C$_4$-alkoxy, phenyl, sulfo, sulfato or halogen, phenyl or phenyl substituted by C$_1$–C$_4$-alkyl, C$_1$–C$_4$-alkoxy, C$_2$–C$_6$alkanoylamino, sulfo or halogen, K$_1$ is benzene or naphthalene or 5-pyrazolone, 5-aminopyrazole, quinoline, acetoacetarylide or benzoylacetarylide which are unsubstituted or substituted by C$_1$–C$_4$alkyl, C$_1$–C$_4$alkoxy, C$_2$–C$_6$alkanoylamino, C$_1$–C$_6$-alkoxycarbonylamino, benzoylamino, amino, mono- or dialkylamino having in each case 1 to 4 carbon atoms in the alkyl radical, phenylamino, C$_1$–C$_4$alkoxycarbonyl, nitro, cyano, trifluoromethyl, halogen, sulfamoyl, carbamoyl, ureido, hydroxyl, C$_1$–C$_4$alkylsulfonyl, carboxyl, sulfomethyl, sulfo, phenylazo or a fibre reactive radical as given above for D$_1$, or K$_1$-Z$_2$ is 1-phenyl-3-methyl-5-pyrazolone, Y' is a nitrogen atom or a CH group, Z$_1$ is an —OH or COOH or —NH$_2$ group in the o-position relative to —N=Y'— and Z$_2$ is a —OH or —NH(R) group, R being hydrogen, C$_1$–C$_4$alkyl or phenyl, and Z$_2$ is bonded to K$_1$ in a position adjacent to —N=Y'—, are bonded to a chromium atom.

14. A heavy metal complex according to claim 13, wherein D$_1$ is phenyl or naphthyl which is unsubstituted or is substituted by C$_1$–C$_4$alkyl, C$_1$–C$_4$alkoxy, C$_2$–C$_6$alkanoylamino, C$_1$–C$_6$alkoxycarbonyl amino, benzoylamino, amino, mono- or dialkylamino having in each case 1 to 4 carbon atoms in the alkyl radical, phenylamino, C$_1$–C$_4$alkoxycarbonyl, nitro, cyano, trifluoromethyl, halogen, sulfamoyl, carbamoyl, ureido, hydroxyl, C$_1$–C$_4$alkylsulfonyl, carboxyl, sulfomethyl, sulfo, a fibre reactive radical as given for D$_1$ in claim 23 and phenylazo, K$_1$ is benzene or naphthalene or 5-pyrazolone, 5-aminopyrazole, quinoline, acetoacetarylide or benzylacetarylide which are unsubstituted or are substituted by C$_1$–C$_4$alkyl, C$_1$–C$_4$alkoxy, C$_2$–C$_6$alkanoylamino, C$_1$–C$_6$alkoxycarbonylamino, benzoylamino, amino, mono- or dialkylamino having in each case 1 to 4 carbon atoms in the alkyl radical, phenylamino, C$_1$–C$_4$alkoxycarbonyl, nitro, cyano, trifluromethyl, halogen, sulfamoyl, carbamoyl, ureid, hydroxyl, C$_1$–C$_4$alkylsulfonyl, carboxyl, sulfomethyl, sulfo, a fibre-reactive as given for K$_1$ in claim 23, and Y' is a nitrogen atom.

15. A heavy metal complex according to claim 11, wherein two molecules of the formula (5), (6) or (7) in which D—OH is a 2-hydroxy-4-nitrophen-1-yl, 2-hydroxy-5-nitrophen-1-yl, 2-hydroxy-4-nitro-5-sulfophen-1-yl, 2-hydroxy-3-sulfo-5-nitrophen-1-yl, 2-hydroxy-3-nitro-5-sulfophen-1-yl, 2-hydroxy-3-sulfo-5-chlorophen-1yl, 2-hydroxy-4-sulfonaphth-1-yl, 2-hydroxy-4-sulfo-6-nitronaphth-1-yl, 2-hydroxy-4-sulfo-6-aminonaphth-1-yl, 2-hydroxy-4-sulfo-6-($\alpha,\beta$-dibromopropionylamino)-naphth-1-yl, 2-hydroxy-5-($\beta$-methoxyethylaminosulfonyl)phen-1-yl, 2-hydroxy-4-aminophen-1-y1, 2-hydroxy-4-($\alpha,\beta$-dibromopropionylamino)-phen-1-yl or 2-carboxy-4-sulfophen-1-yl radical, the benzene ring E in the formulae (5) and (6) is unsubstituted and in the formula (7) is unsubstituted or is substituted by nitro, amino or $\alpha,\beta$-dibromopropionylamino, and R' is hydrogen, are bonded to one atom of chromium or cobalt.

16. A heavy metal complex according to claim 13, which contains bonded one molecule of the azo dye of the formula (5) in which D—OH is a 2-hydroxy-4-sulfonaphth-1-yl, 2-hydroxy-4-sulfo-6-nitronaphth-1-yl or 2-hydroxy-4-nitrophen-1-yl radical and the benzene ring E is unsubstituted, and one molecule of the azo dye of the formula (8) in which D$_1$-Z$_1$ is a 2-hydroxy-5-nitrophen-1-yl, 2-hydroxy-4-sulfonaphth-1-yl or 2-hydroxy-4-nitrophen-1-yl radical and K$_1$-Z$_2$ is a 1-hydroxy-5,8-dichloronaphth-2-yl, 2-hydroxynaphth-1-yl, 2-hydroxy-6-sulfonaphth-1-yl or 1-phenyl-3-methyl-5-pyrazolone radical, and Y' is a nitrogen atom.

17. A heavy metal complex according to claim 11, wherein one molecule of the formula (5) or (7) in which D—OH is a 2-hydroxy-4nitrophen-1-yl, 2-hydroxy-4-nitro-5-sulfophen-1-yl, 2-hydroxy-4-sulfonaphth-1-yl, 2-hydroxy-4-sulfo-6-nitronaphth-1-yl, 2-hydroxy-4-sulfo-6-aminonaphth-1-yl, 2-hydroxy-4-sulfo-6-($\alpha,\beta$-dibromopropionylamino)-naphth-1-yl or 2-carboxy-4-sulfophen-1-yl radical, the benzene ring E in the formula (5) is unsubstituted and in the formula (7) is unsubstituted or is substituted by nitro, amino or $\alpha$, $\beta$-dibromopropionylamino, and R' is hydrogen, is bonded to one atom of chromium.

* * * * *